United States Patent
Wang et al.

(10) Patent No.: US 11,991,632 B2
(45) Date of Patent: May 21, 2024

(54) METHOD FOR TRANSMITTING AND RECEIVING A SIGNAL, NETWORK APPARATUS, AND TERMINAL

(71) Applicant: DATANG MOBILE COMMUNICATIONS EQUIPMENT CO., LTD., Beijing (CN)

(72) Inventors: Jiaqing Wang, Beijing (CN); Qiubin Gao, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 544 days.

(21) Appl. No.: 17/257,003

(22) PCT Filed: Jul. 10, 2019

(86) PCT No.: PCT/CN2019/095445
§ 371 (c)(1),
(2) Date: Dec. 30, 2020

(87) PCT Pub. No.: WO2020/029738
PCT Pub. Date: Feb. 13, 2020

(65) Prior Publication Data
US 2021/0368444 A1 Nov. 25, 2021

(30) Foreign Application Priority Data
Aug. 10, 2018 (CN) .......................... 201810910244.1

(51) Int. Cl.
*H04B 7/185* (2006.01)
*H04W 52/02* (2009.01)
(Continued)

(52) U.S. Cl.
CPC ... *H04W 52/0232* (2013.01); *H04W 52/0235* (2013.01); *H04W 72/0446* (2013.01); *H04W 72/0453* (2013.01); *H04W 72/23* (2023.01)

(58) Field of Classification Search
CPC ......... H04W 52/0232; H04W 52/0235; H04W 72/0446; H04W 72/0453; H04W 72/23;
(Continued)

(56) References Cited

U.S. PATENT DOCUMENTS 7,952,565 B2 * 5/2011 Park ...................... G06F 3/0416
345/173
8,600,379 B2 * 12/2013 Kim .................. H04W 52/0245
455/574

(Continued)

FOREIGN PATENT DOCUMENTS

CN  107182027 A  9/2017
CN  107431982 A  12/2017
(Continued)

OTHER PUBLICATIONS

Intel Corporation, "Analysis of impact of Wake-up signaling on power consumption and resource", 3GPP TSG RAN WG1 Meeting #89,Hangzhou, P.R. China May 15-19, 2017, total 7 pages, R1-1707315.
(Continued)

*Primary Examiner* — Amancio Gonzalez
(74) *Attorney, Agent, or Firm* — Kilpatrick Townsend & Stockton LLP

(57) ABSTRACT

The present application discloses a signal transmitting and receiving method, a network apparatus, and a terminal, for reducing power consumption of terminals. The signal transmitting method comprises: a network apparatus determining a wake-up identifier of a terminal to be awakened, wherein the terminal is a terminal that needs to be awakened during a discontinuous reception (DRX) period, the wake-up iden-
(Continued)

tifier is a wake-up identifier configured by the network apparatus for at least one terminal to be awakened; and the network apparatus generating, according to the wake-up identifier, an energy saving instruction signal and transmitting the same, the energy saving instruction signal instructing the terminal to monitor a physical downlink control channel (PDCCH) during the DRX period.

17 Claims, 3 Drawing Sheets

(51) Int. Cl.
  *H04W 72/0446* (2023.01)
  *H04W 72/0453* (2023.01)
  *H04W 72/23* (2023.01)
(58) Field of Classification Search
  CPC ..... H04W 68/00; H04W 76/27; H04W 76/11; H04W 76/28; H04W 52/0229; H04W 48/10; H04W 52/0212; H04L 5/0053; Y02D 30/70
  USPC .......................................................... 370/318
  See application file for complete search history.

(56) References Cited

U.S. PATENT DOCUMENTS

| | | | | |
|---|---|---|---|---|
| 8,774,138 B2* | 7/2014 | Ramos | ................. | H04W 72/52 |
| | | | | 370/336 |
| 8,923,178 B2* | 12/2014 | Anderson | ......... | H04W 52/0222 |
| | | | | 370/252 |
| 9,860,836 B2* | 1/2018 | Mochizuki | ............ | H04W 48/16 |
| 9,986,452 B2* | 5/2018 | Liu | ........................ | H04W 24/10 |
| 10,004,099 B2* | 6/2018 | Johansson | ............. | H04W 76/28 |
| 10,159,109 B2* | 12/2018 | Kanesalingam | ...... | H04W 72/30 |
| 10,211,838 B2* | 2/2019 | Liu | ........................ | H03L 1/026 |
| 10,716,067 B2* | 7/2020 | Mu | ..................... | H04L 27/2602 |
| 10,743,257 B2* | 8/2020 | Liu | .................... | H04W 52/0229 |
| 10,863,436 B2* | 12/2020 | Jeong | ................ | H04W 52/0216 |
| 10,880,895 B2* | 12/2020 | Gordaychik | .......... | H04W 52/18 |
| 10,966,155 B1* | 3/2021 | Kasslin | ................ | H04W 76/28 |
| 10,986,572 B2* | 4/2021 | Gan | .................. | H04W 52/0235 |
| 11,032,047 B2* | 6/2021 | Liu | .................... | H04W 52/0229 |
| 11,234,200 B2* | 1/2022 | Åström | ............... | H04W 56/001 |
| 11,297,674 B2* | 4/2022 | He | ........................ | H04W 76/28 |
| 11,330,575 B2* | 5/2022 | Lin | ........................ | H04W 80/08 |
| 11,356,949 B2* | 6/2022 | Xu | ........................ | H04W 76/28 |
| 11,363,668 B2* | 6/2022 | Tang | .................. | H04W 72/0466 |
| 11,678,282 B2* | 6/2023 | Åström | ............. | H04W 52/0216 |
| | | | | 370/350 |
| 2012/0275364 A1 | 11/2012 | Anderson et al. | | |
| 2012/0275366 A1* | 11/2012 | Anderson | ......... | H04W 52/0219 |
| | | | | 370/311 |
| 2015/0195780 A1* | 7/2015 | Liu | .................... | H04W 52/0216 |
| | | | | 370/311 |
| 2015/0230180 A1* | 8/2015 | Lim | ...................... | H04W 76/14 |
| | | | | 370/315 |
| 2016/0007170 A1 | 1/2016 | Vaidya et al. | | |
| 2018/0049126 A1 | 2/2018 | Cheng | | |
| 2018/0084501 A1* | 3/2018 | Mu | ................... | H04W 52/0235 |
| 2019/0254110 A1* | 8/2019 | He | ........................ | H04L 5/0048 |
| 2020/0029315 A1* | 1/2020 | Lin | ........................ | H04L 1/0075 |
| 2020/0383054 A1* | 12/2020 | Tang | .................... | H04W 72/23 |
| 2022/0232536 A1* | 7/2022 | Lin | .................... | H04W 52/0216 |

FOREIGN PATENT DOCUMENTS

| | | |
|---|---|---|
| CN | 108235412 A | 6/2018 |
| EP | 3257321 A1 | 12/2017 |
| KR | 102435028 B1 | 8/2022 |
| WO | 2018031327 A1 | 2/2018 |
| WO | 2018082402 A1 | 5/2018 |

OTHER PUBLICATIONS

Sierra Wireless, "Wake-Up Signal Design Considerations", 3GPP TSG RAN WG1 Meeting #93, Busan, Korea, May 21-May 25, 2018, total 9 pages, R1-1806001.

Ericsson, "DRX with short onDuration and Wake-up signaling", 33GPP TSG-RAN WG2 #101, Athens, Greece, Feb. 26-Mar. 2, 2018, total 3 pages, R2-1803189.

Huawei et al., "On 'wake-up signal' for eFeMTC", 3GPP TSG RAN WG1 Meeting #90bis, Prague, Czech Republic, Oct. 9-13, 2017, total 7 pages, R1-1716970.

OPPO. "On wake-up signal functionalities"; 3GPP TSG RAN WG1 Meeting91, Reno, USA, Nov. 27-Dec. 1, 2017, total 5 pages, R1-1719997.

Huawei et al., "On detailed design and evaluations of power saving signal", 3GPP TSG RAN WG1 Meeting #92bis, Sanya, China, Apr. 16-20, 2018, total 20 pages, R1-1803868.

Huawei et al., "On 'wake-up signal' for eFeMTC", 3GPP TSG RAN WG1 Meeting #92bis, Sanya, China, Apr. 16-20, 2018, total 8 pages, R1-1803885.

Qualcomm, "Wakeup Signaling for multi-beam systems", 3GPP TSG-RAN WG2 Meeting RAN2 #99bis, Prague, Czech, Oct. 9-13, 2017, total 5 pages, R2-1711703(Resubmission of R2-1709116).

* cited by examiner

WUS: Wake-Up signal     PO: Paging Occasion

DRX: Discontinuous Reception     PDCCH: Physical Downlink Control Channel

METHOD FOR TRANSMITTING AND RECEIVING A SIGNAL, NETWORK APPARATUS, AND TERMINAL

The present application is a national phase entry under 35 U.S.C. § 371 of International Application No. PCT/CN2019/095445, filed on Jul. 10, 2019, which claims the priority from Chinese Patent Application No. 201810910244.1, filed on Aug. 10, 2018, in the China National Intellectual Property Administration and entitled "Signal Transmitting and Receiving Method, Network Apparatus, and Terminal", which is hereby incorporated by reference in its entirety.

FIELD

The present application relates to the field of wireless communication technologies, and in particular to a method for transmitting and receiving a signal, a network device, and a terminal.

BACKGROUND

In the New Radio (NR) Access Technology in 3GPP system (i.e., 5G system), since the 5G system supports the larger bandwidth, higher throughput, and more complex services with more complex processing technologies to match, the power-saving optimization design of the terminal can save the power consumption of the terminal, extend the battery life and thus improve the user experience, which is very important for the 5G industrialization.

In a wireless communication system, a network device can periodically send a paging signal to a terminal in the idle state in a cell to indicate whether the terminal should switch from the idle state to the connected state, so as to exchange the service data with the terminal. Before detecting a possible paging signal each time, the terminal needs to blindly detect the Physical Downlink Control Channel (PDCCH) of the paging signal. If it receives the PDCCH of the paging signal, it will continue to decode the paging signal, otherwise it will not decode again. The terminal in the idle state wakes up periodically to detect the paging signal. The period of regular wake-up is called the Discontinuous Reception (DRX) period, and the position where it wakes up is called the Paging Occasion (PO). The vertical dotted lines indicate PO positions in FIG. 1. The terminal will detect the PDCCH in the search space starting at the PO position to judge whether it is paged by the network device. If paged, it means that the network side has sent the data and the terminal needs to enter the connected state to receive the downlink data.

In the Narrow Band Internet of Things (NB-IoT), the network device is configured with a Wake Up Signal (WUS) before it reaches the PO position to indicate whether the terminal device needs to wake up at the PO position. The network device sends the WUS before sending the paging signal. If the WUS is detected, the PDCCH of the paging signal starts to be blindly detected by the terminal. If no WUS is detected, the detection of the paging signal staring at the PO position will be abandoned. Since the WUS can be designed as a sequence of which the detection complexity is much lower than that of blind detection of the PDCCH, the usage of the WUS can greatly reduce the receiving power consumption.

Since the terminal in the NB-IoT has a slower moving speed, is less sensitive to delay, and has a slower transmission rate, the power consumption can be optimized only for the terminal in the idle state. However, the 5G system supports the larger bandwidth, higher throughput, and more complex services with more complex processing technologies to match, so the WUS transmitting method in the NB-IoT is not applicable to the NR system. Furthermore, for the NR system, the processing complexity of the terminal chip of the NR system is much higher than that of the NB-IoT, and the power consumption of the terminal is mainly focus on the connection state of the terminal. At present, there is still no good solution for the problem of the terminal power consumption of the NR system.

Therefore, there is an urgent need for a signal transmitting method to reduce the power consumption of the terminal in the NR system.

SUMMARY

An embodiment of the present application provides a method for transmitting a signal, including: determining, by a network device, a wake-up identifier of a terminal to be awakened; where the terminal to be awakened is a terminal that needs to be awakened during a Discontinuous Reception (DRX) cycle; and the wake-up identifier is configured by the network device for at least one terminal to be awakened; generating, by the network device, a power saving instruction signal according to the wake-up identifier, and transmitting the power saving instruction signal; where the power saving instruction signal instructs the terminal to be awakened to monitor a PDCCH during the DRX cycle.

In a possible implementation, before the network device determines the wake-up identifier of the terminal to be awakened, the method further includes: assigning, by the network device, a wake-up identifier to at least one terminal to be awakened; transmitting, by the network device, the wake-up identifier to the at least one terminal to be awakened through semi-static signaling.

In a possible implementation, before the network device determines the wake-up identifier of the terminal to be awakened, the method further includes: configuring, by the network device, a wake-up identifier for the terminal to be awakened if the network device determines that the terminal to be awakened has no wake-up identifier, or setting, by the network device, the wake-up identifier of the terminal to be awakened as a dedicated identifier if the network device determines that the terminal to be awakened has no wake-up identifier.

In a possible implementation, the DRX cycle comprises N continuous DRX cycles or N discontinuous DRX cycles; or, the DRX cycle is an $M^{th}$ DRX cycle after the power saving instruction signal; and the N and M are positive integers greater than or equal to 1.

In a possible implementation, before the network device transmits the power saving instruction signal, the method includes: configuring, by the network device, time-domain transmission resources for the terminal; where the time-domain transmission resources correspond to the DRX cycle; and the time-domain transmission resources include a distance between the power saving instruction signal and a start point of the DRX cycle, and/or the maximum time occupied by the power saving instruction signal, and/or the time occupied by the power saving instruction signal; transmitting, by the network device, the power saving instruction signal, includes: transmitting, by the network device, the power saving instruction signal on the time-domain transmission resources.

In a possible implementation, before the network device transmits the power saving instruction signal, the method further includes: configuring, by the network device, the maximum time occupied by the power saving instruction signal for the terminal through broadcast information; and/ or, configuring, by the network device, the time occupied by the power saving instruction signal for the terminal through semi-static signaling or dynamic signaling; and/or, configuring, by the network device, the distance between the power saving instruction signal and the start point of the DRX cycle for the terminal through semi-static signaling or dynamic signaling.

In a possible implementation, before the network device determines the wake-up identifier of the terminal to be awakened, the method further includes: configuring, by the network device, preset frequency-domain transmission resources for the terminal according to a preset rule; transmitting, by the network device, the power saving instruction signal, includes: transmitting, by the network device, the power saving instruction signal on the preset frequency-domain transmission resources.

In a possible implementation, before the network device transmits the power saving instruction signal, the method further includes: configuring, by the network device, preset frequency-domain transmission resources for the terminal to be awakened; where the preset frequency-domain transmission resources are for the network device transmitting the power saving instruction signal; transmitting, by the network device, the preset frequency-domain transmission resources to the terminal to be awakened through semi-static signaling;

transmitting, by the network device, the power saving instruction signal, includes: transmitting, by the network device, the power saving instruction signal on the preset frequency-domain transmission resources.

In a possible implementation, after the network device determines the wake-up identifier of the terminal to be awakened and before transmitting the power saving instruction signal, the method further includes: assigning, by the network device, frequency-domain transmission resources for the terminal to be awakened; where the frequency-domain transmission resources are for the network device transmitting the power saving instruction signal to the terminal to be awakened; transmitting, by the network device, the frequency-domain transmission resources to the terminal to be awakened through semi-static signaling; transmitting, by the network device, the power saving instruction signal, includes: transmitting, by the network device, the power saving instruction signal on the frequency-domain transmission resources.

In a possible implementation, transmitting, by the network device, the frequency-domain transmission resources through semi-static signaling, includes: transmitting, by the network device, a first configuration signaling carrying the wake-up identifier and the frequency-domain transmission resources to the terminal to be awakened; or, transmitting, by the network device, a first configuration signaling carrying the wake-up identifier and the preset frequency-domain transmission resources to the terminal to be awakened; or, transmitting, by the network device, a second configuration signaling carrying the frequency-domain transmission resources to the terminal to be awakened; or, transmitting, by the network device, a second configuration signaling carrying the preset frequency-domain transmission resources to the terminal to be awakened; or, transmitting, by the network device, a third configuration signaling carrying the wake-up identifier to the terminal to be awakened.

In a possible implementation, configuring, by the network device, frequency-domain transmission resources for the terminal to be awakened, includes: taking, by the network device, one or more of a function of frequency-domain transmission resources of a PDCCH, a function of frequency-domain transmission resources of a synchronization signal, and a function of frequency-domain transmission resources of a Physical Random Access Channel (PRACH) of the terminal to be awakened as the frequency-domain transmission resources configured by the network device for the terminal to be awakened.

In a possible implementation, if the network device determines that the power saving instruction signal to be transmitted on the frequency-domain transmission resources collide with one or more of a synchronization signal, a broadcast signal, a discovery signal and a pilot signal, the power saving instruction signal is not transmitted on the frequency-domain transmission resources.

In a possible implementation, the frequency-domain transmission resources are different from frequency-domain transmission resources for transmitting data; or, the frequency-domain transmission resources are obtained by switching frequency-domain transmission resources for transmitting data.

In a possible implementation, the frequency-domain transmission resources are obtained by switching the frequency-domain transmission resources for transmitting data, which includes: transmitting, by the network device, a first switching instruction to the terminal; where the first switching instruction notifies the terminal to switch to receive the power saving instruction signal on the frequency-domain transmission resources configured for the terminal; or, transmitting, by the network device, a second switching instruction to the terminal; where the second switching instruction notifies the terminal to switch from the frequency-domain transmission resources for receiving the power saving instruction signal to the frequency-domain transmission resources for data transmission.

In a possible implementation, a Bandwidth Part (BWP) for transmitting the power saving instruction signal is different from a BWP for transmitting data; or, the BWP for transmitting the energy saving instruction signal is obtained by switching a BWP for transmitting data.

In a possible implementation, the method further includes: transmitting a wake-up instruction signal on a BWP if the network device determines that the terminal is in an idle state or inactive state; or transmitting the wake-up instruction signal in at least one beam direction if the network device determines that the terminal is in an idle state or inactive state; or transmitting the power saving instruction signal in a beam direction where the terminal to be awakened resides if the network device determines that the terminal is in a connected state.

In a possible implementation, determining, by the network device, a wake-up identifier of a terminal to be awakened, includes: determining, by the network device, whether wake-up identifiers of terminals to be awakened are the same; and if not, configuring a same wake-up identifier for the terminals to be awakened.

In a possible implementation, configuring, by the network device, a same wake-up identifier for the terminals to be awakened, includes: transmitting, by the network device, instruction information for updating the wake-up identifier to the terminal to be awakened; where the instruction information carries the configured wake-up identifier.

In a possible implementation, the method further includes: configuring, by the network device, turning on or off of a wake-up indication mode for the terminal to be awakened; where the turning on of the wake-up indication mode instructs the terminal to be awakened to monitor a PDCCH according to the power saving instruction signal when the DRX cycle starts; and the turning off of the wake-up mode instructs the terminal to be awakened to monitor the PDCCH when the DRX cycle starts; or, the turning on of the wake-up indication mode instructs the terminal to be awakened to monitor the power saving instruction signal before a paging signal; and the turning off of the wake-up mode instructs the terminal to be awakened to directly monitor a PDCCH of the paging signal without detecting the power saving instruction signal before receiving the paging signal.

In a possible implementation, configuring, by the network device, turning on or off of a wake-up indication mode for the terminal to be awakened, includes: transmitting, by the network device, configurations for the turning on or off of the wake-up indication mode to the terminal to be awakened through any one of broadcast information, semi-static signaling or dynamic signaling.

An embodiment of the present application provides a method for receiving a signal, which includes: receiving, by a terminal to be awakened, a power saving instruction signal transmitted by a network device; where the terminal to be awakened is a terminal that needs to be awakened during a DRX cycle; and the wake-up identifier is configured by the network device for at least one terminal to be awakened; monitoring, by the terminal to be awakened, a PDCCH in the DRX cycle according to the power saving instruction signal after determining that a wake-up identifier carried in the power saving instruction signal is equal to its own wake-up identifier.

In a possible implementation, before the terminal to be awakened receives the power saving instruction signal transmitted by the network device, the method further includes: receiving, by the terminal to be awakened, a wake-up identifier transmitted by the network device through semi-static signaling; where the wake-up identifier is a same wake-up identifier assigned by the network device to at least one terminal to be awakened including the terminal to be awakened.

In a possible implementation, the DRX cycles comprises N continuous DRX cycles or N discontinuous DRX cycles; or, the DRX cycle is the $M^{th}$ DRX cycle after the power saving instruction signal; and the N and M are positive integers greater than or equal to 1.

In a possible implementation, receiving, by the terminal to be awakened, the power saving instruction signal, includes: receiving, by the terminal to be awakened, the power saving instruction signal on time-domain transmission resources; where the time-domain transmission resources are configured by the network device for the terminal to be awakened; the time-domain transmission resources correspond to the DRX cycle; and the time-domain transmission resources include a distance between the power saving instruction signal and a start point of the DRX cycle, and/or the maximum time occupied by the power saving instruction signal, and/or the time occupied by the power saving instruction signal.

In a possible implementation, before the terminal to be awakened receives the power saving instruction signal, the method further includes: receiving, by the terminal to be awakened, the maximum time occupied by the power saving instruction signal configured by the network device for the terminal through broadcast information; and/or, receiving, by the terminal to be awakened, the time occupied by the power saving instruction signal configured by the network device for the terminal through semi-static signaling or dynamic signaling; and/or, receiving, by the terminal to be awakened, the distance between the power saving instruction signal and the start point of the DRX cycle configured by the network device for the terminal through semi-static signaling or dynamic signaling.

In a possible implementation, receiving, by the terminal to be awakened, the power saving instruction signal transmitted by a network device, includes: receiving, by the terminal to be awakened, the power saving instruction signal on preset frequency-domain transmission resources; where the preset frequency-domain transmission resources are configured by the network device for the terminal according to a preset rule.

In a possible implementation, before the terminal to be awakened receives the power saving instruction signal transmitted by the network device, the method further includes: receiving, by the terminal to be awakened, preset frequency-domain transmission resources through semi-static signaling; where the preset frequency-domain transmission resources are configured by the network device for the terminal to be awakened; and the preset frequency-domain transmission resources are for the network device transmitting the power saving instruction signal; receiving, by the terminal to be awakened, the power saving instruction signal transmitted by a network device, includes: receiving, by the terminal to be awakened, the power saving instruction signal on the preset frequency-domain transmission resources.

In a possible implementation, before the terminal to be awakened receives the power saving instruction signal transmitted by the network device, the method further includes: receiving, by the terminal to be awakened, frequency-domain transmission resources through semi-static signaling; where the frequency-domain transmission resources are configured by the network device for the terminal to be awakened; receiving, by the terminal to be awakened, the power saving instruction signal transmitted by a network device, includes: receiving, by the terminal to be awakened, the power saving instruction signal on the frequency-domain transmission resources.

In a possible implementation, receiving, by the terminal to be awakened, frequency-domain transmission resources or preset frequency-domain transmission resources through semi-static signaling, includes: receiving, by the terminal to be awakened, a first configuration signaling transmitted by the network device; where the first configuration signaling includes the wake-up identifier and the frequency-domain transmission resources or the preset frequency-domain transmission resources; or, receiving, by the terminal to be awakened, a second configuration signaling transmitted by the network device; where the second configuration signaling includes the frequency-domain transmission resources or the preset frequency-domain transmission resources; or, receiving, by the terminal to be awakened, a third configuration signaling transmitted by the network device; where the third configuration signaling includes the wake-up identifier.

In a possible implementation, the frequency-domain transmission resources or the preset frequency-domain transmission resources are one or more of the function of frequency-domain transmission resources of a PDCCH, the function of frequency-domain transmission resources of a synchronization signal, and the function of frequency-domain transmission resources of a PRACH of the terminal to be awakened.

In a possible implementation, the method further includes: if the frequency-domain transmission resources for receiving the power saving instruction signal collide with one or more of a synchronization signal, a broadcast signal, a discovery signal and a pilot signal, the terminal does not receive the power saving instruction signal on the frequency-domain transmission resources.

In a possible implementation, the frequency-domain transmission resources are different from frequency-domain transmission resources for transmitting data; or, the frequency-domain transmission resources are obtained by switching frequency-domain transmission resources for transmitting data.

In a possible implementation, the frequency-domain transmission resources are obtained by switching the frequency-domain transmission resources for transmitting data, which includes: receiving, by the terminal, a first switching instruction transmitted by the network device; receiving, by the terminal, the power saving instruction signal includes: switching, by the terminal, from the frequency-domain transmission resources for data transmission onto the frequency-domain transmission resources configured for the terminal to receive the power saving instruction signal according to the first switching instruction.

In a possible implementation, the frequency-domain transmission resources are obtained by switching frequency-domain transmission resources for transmitting data, and the method further includes: receiving, by the terminal, a second switching instruction transmitted by the network device; switching, by the terminal, from the frequency-domain transmission resources for receiving the power saving instruction signal to the frequency-domain transmission resources for data transmission according to the second switching instruction.

In a possible implementation, a BWP for transmitting the power saving instruction signal is different from a BWP for transmitting data; or, the BWP for transmitting the power saving instruction signal is obtained by switching the BWP for transmitting data.

In a possible implementation, the method further includes: receiving a wake-up instruction signal on a BWP if the terminal is in an idle state or inactive state; or, receiving the wake-up instruction signal in at least one beam direction if the terminal is in an idle state or inactive state; or, receiving, by the terminal, the power saving instruction signal in a beam direction where the terminal resides if the terminal is in a connected state.

In a possible implementation, receiving, by the terminal, the wake-up instruction signal in at least one beam direction, includes: determining, by the terminal, one beam direction for the wake-up instruction signal transmitted in at least one beam direction; receiving, by the terminal, the wake-up instruction signal in the determined beam direction.

In a possible implementation, before the terminal to be awakened receives the power saving instruction signal, the method further includes: receiving, by the terminal to be awakened, indication information for updating the wake-up identifier transmitted by the network device; where the indication information carries the configured wake-up identifier; updating, by the terminal to be awakened, the wake-up identifier of the terminal to be awakened to the configured wake-up identifier according to the indication information.

In a possible implementation, the method further includes: acquiring, by the terminal to be awakened, configurations for turning on or off of a wake-up indication mode configured by the network device for the terminal to be awakened; configuring, by the terminal to be awakened, the wake-up indication mode of the terminal to be awakened according to the configured turning on or off of the wake-up indication mode; the turning on of the wake-up indication mode instructs the terminal to be awakened to monitor a PDCCH according to the power saving instruction signal when the DRX cycle starts; and the turning off of the wake-up mode instructs the terminal to be awakened to monitor the PDCCH when the DRX cycle starts; or, the turning on of the wake-up indication mode instructs the terminal to be awakened to monitor the power saving instruction signal before receiving a paging signal; and the turning off of the wake-up mode instructs the terminal to be awakened to directly monitor a PDCCH of the paging signal without detecting the power saving instruction signal before receiving the paging signal.

In a possible implementation, acquiring, by the terminal to be awakened, turning on or off of a wake-up indication mode configured by the network device for the terminal to be awakened, includes: acquiring, by the terminal to be awakened, the configurations for turning on or off of the wake-up indication mode configured by the network device for the terminal to be awakened through any one of broadcast information, semi-static signaling or dynamic signaling.

An embodiment of the present application provides a communication device, including: a processing device configured to determine a wake-up identifier of a terminal to be awakened; where the terminal to be awakened is a terminal that needs to be awakened during a DRX cycle; and the wake-up identifier is configured by the network device for at least one terminal to be awakened; and generate a power saving instruction signal according to the wake-up identifier; a transmitting device configured to transmit the power saving instruction signal; where the power saving instruction signal instructs the terminal to be awakened to monitor a PDCCH during the DRX cycle.

In a possible implementation, the processing device is further configured to: assign a wake-up identifier to at least one terminal to be awakened; the transmitting device is further configured to transmit the wake-up identifier to the at least one terminal to be awakened through semi-static signaling.

In a possible implementation, the processing device is further configured to: configure a wake-up identifier for the terminal to be awakened or set the wake-up identifier of the terminal to be awakened as a dedicated identifier when determining that the terminal to be awakened has no wake-up identifier.

In a possible implementation, the DRX cycles comprises N continuous DRX cycles or N discontinuous DRX cycles; or, the DRX cycle is the $M^{th}$ DRX cycle after the power saving instruction signal; and the N and M are positive integers greater than or equal to 1.

In a possible implementation, the processing device is further configured to configure time-domain transmission resources for the terminal; where the time-domain transmission resources correspond to the DRX cycle; and the time-domain transmission resources include a distance between the power saving instruction signal and a start point of the DRX cycle, and/or the maximum time occupied by the power saving instruction signal, and/or the time occupied by the power saving instruction signal; the transmitting device is further configured to transmit the power saving instruction signal on the time-domain transmission resources.

In a possible implementation, the transmitting device is configured to configure the maximum time occupied by the power saving instruction signal for the terminal through broadcast information; and/or, the transmitting device is configured to configure the time occupied by the power saving instruction signal for the terminal through semi-static signaling or dynamic signaling; and/or, the transmitting device is configured to configure the distance between the power saving instruction signal and the start point of the DRX cycle for the terminal through semi-static signaling or dynamic signaling.

In a possible implementation, the processing device is further configured to configure preset frequency-domain transmission resources for the terminal according to a preset rule; where the frequency-domain transmission resources include at least one frequency-domain transmission resource allocated for the terminal; the transmitting device is configured to transmit the power saving instruction signal on the preset frequency-domain transmission resources.

In a possible implementation, the processing device is further configured to configure preset frequency-domain transmission resources for the terminal to be awakened; the transmitting device is configured to configure the preset frequency-domain transmission resources for the terminal to be awakened through semi-static signaling; and transmit the power saving instruction signal on the preset frequency-domain transmission resources.

In a possible implementation, the processing device is further configured to configure frequency-domain transmission resources for the terminal to be awakened; where the frequency-domain transmission resources are for the network device transmitting the power saving instruction signal to the terminal to be awakened; the transmitting device is configured to transmit the frequency-domain transmission resources to the terminal to be awakened through semi-static signaling; and transmit the power saving instruction signal on the frequency-domain transmission resources.

In a possible implementation, the transmitting device is configured to: transmit a first configuration signaling carrying the wake-up identifier and the frequency-domain transmission resources to the terminal to be awakened; or, transmit a first configuration signaling carrying the wake-up identifier and the preset frequency-domain transmission resources to the terminal to be awakened; or, transmit a second configuration signaling carrying the frequency-domain transmission resources to the terminal to be awakened; or, transmit a second configuration signaling carrying the preset frequency-domain transmission resources to the terminal to be awakened; or, transmit a third configuration signaling carrying the wake-up identifier to the terminal to be awakened.

In a possible implementation, the processing device is configured to take one or more of a function of frequency-domain transmission resources of a PDCCH, a function of frequency-domain transmission resources of a synchronization signal, and a function of frequency-domain transmission resources of a PRACH of the terminal to be awakened as the frequency-domain transmission resources configured by the network device for the terminal to be awakened.

In a possible implementation, the processing device is further configured to: not transmit the power saving instruction signal on the frequency-domain transmission resources when determining that the power saving instruction signal to be transmitted on the frequency-domain transmission resources collide with one or more of a synchronization signal, a broadcast signal, a discovery signal and a pilot signal.

In a possible implementation, the frequency-domain transmission resources are different from the frequency-domain transmission resources for transmitting data; or, the frequency-domain transmission resources are obtained by switching frequency-domain transmission resources for transmitting data.

In a possible implementation, the transmitting device is configured to transmit a first switching instruction to the terminal; where the first switching instruction notifies the terminal to switch to receive the power saving instruction signal on the frequency-domain transmission resources configured for the terminal; or, the transmitting device is configured to transmit a second switching instruction to the terminal; where the second switching instruction notifies the terminal to switch from the frequency-domain transmission resources for receiving the power saving instruction signal to the frequency-domain transmission resources for data transmission.

In a possible implementation, a BWP for transmitting the power saving instruction signal is different from a BWP for transmitting data; or, the BWP for transmitting the power saving instruction signal is obtained by switching a BWP for transmitting data.

In a possible implementation, the transmitting device is further configured to: transmit a wake-up instruction signal on a BWP when determining that the terminal is in an idle state or inactive state; or, transmit the wake-up instruction signal in at least one beam direction when determining that the terminal is in an idle state or inactive state; or, transmit the power saving instruction signal in a beam direction where the terminal resides when determining that the terminal is in a connected state.

In a possible implementation, the processing device is further configured to: determine whether wake-up identifiers of terminals to be awakened are the same; and if not, configure a same wake-up identifier for the terminals to be awakened.

In a possible implementation, the transmitting device is further configured to transmit the instruction information for updating the wake-up identifier to the terminal to be awakened; where the instruction information carries the configured wake-up identifier.

In a possible implementation, the processing device is further configured to: configure turning on or off of a wake-up indication mode for the terminal to be awakened; where the turning on of the wake-up indication mode instructs the terminal to be awakened to monitor a PDCCH according to the power saving instruction signal when the DRX cycle starts; and the turning off of the wake-up mode instructs the terminal to be awakened to monitor the PDCCH when the DRX cycle starts; or, the turning on of the wake-up indication mode instructs the terminal to be awakened to monitor the power saving instruction signal before receiving a paging signal; and the turning off of the wake-up mode instructs the terminal to be awakened to directly monitor a PDCCH of the paging signal without detecting the power saving instruction signal before receiving the paging signal.

In a possible implementation, the transmitting device is further configured to: transmit configurations for the turning on or off of the wake-up indication mode to the terminal to be awakened through any one of broadcast information, semi-static signaling or dynamic signaling.

An embodiment of the present application provides a communication device, which includes: a receiving device configured to receive a power saving instruction signal transmitted by a network device; where the terminal to be awakened is a terminal that needs to be awakened during a DRX cycle; and the wake-up identifier is configured by the network device for at least one terminal to be awakened; a processing device configured to monitor a PDCCH in the DRX cycle according to the power saving instruction signal after determining that a wake-up identifier carried in the power saving instruction signal is equal to its own wake-up identifier.

In a possible implementation, the receiving device is further configured to: receive a wake-up identifier transmitted by the network device through semi-static signaling; where the wake-up identifier is a same wake-up identifier assigned by the network device to at least one terminal to be awakened including the terminal to be awakened.

In a possible implementation, the DRX cycle comprises N continuous DRX cycles or N discontinuous DRX cycles; or, the DRX cycle is the $M^{th}$ DRX cycle after the energy saving instruction signal; and the N and M are positive integers greater than or equal to 1.

In a possible implementation, the receiving device is further configured to: receive the power saving instruction signal on time-domain transmission resources; where the time-domain transmission resources are configured by the network device for the terminal to be awakened; the time-domain transmission resources correspond to the DRX cycle; and the time-domain transmission resources include a distance between the power saving instruction signal and a start point of the DRX cycle, and/or the maximum time occupied by the power saving instruction signal, and/or the time occupied by the power saving instruction signal.

In a possible implementation, the receiving device is further configured to: receive the maximum time occupied by the power saving instruction signal configured by the network device for the terminal through broadcast information; or, receive the time occupied by the power saving instruction signal configured by the network device for the terminal through semi-static signaling or dynamic signaling; or, receive the distance between the power saving instruction signal and the start point of the DRX cycle configured by the network device for the terminal through semi-static signaling or dynamic signaling.

In a possible implementation, the receiving device is configured to: receive the power saving instruction signal on preset frequency-domain transmission resources; where the preset frequency-domain transmission resources are configured by the network device for the terminal according to a preset rule, and the frequency-domain transmission resources include at least one frequency-domain transmission resource allocated for the terminal.

In a possible implementation, the receiving device is further configured to: receive preset frequency-domain transmission resources through semi-static signaling; where the preset frequency-domain transmission resources are configured by the network device for the terminal to be awakened; and receive the power saving instruction signal on the preset frequency-domain transmission resources.

In a possible implementation, the receiving device is further configured to: receive frequency-domain transmission resources through semi-static signaling; where the frequency-domain transmission resources are configured by the network device for the terminal to be awakened; and receive the power saving instruction signal on the frequency-domain transmission resources.

In a possible implementation, the receiving device is further configured to: receive a first configuration signaling transmitted by the network device; where the first configuration signaling includes the wake-up identifier and the frequency-domain transmission resources or the preset frequency-domain transmission resources; or, receive a second configuration signaling transmitted by the network device; where the second configuration signaling includes the frequency-domain transmission resources or the preset frequency-domain transmission resources; or, receive a third configuration signaling transmitted by the network device; where the third configuration signaling includes the wake-up identifier.

In a possible implementation, the frequency-domain transmission resources or the preset frequency-domain transmission resources are one or more of the function of frequency-domain transmission resources of a PDCCH, the function of frequency-domain transmission resources of a synchronization signal, and the function of frequency-domain transmission resources of a PRACH of the terminal to be awakened.

In a possible implementation, the receiving device is further configured to: if the frequency-domain transmission resources for receiving the power saving instruction signal collide with one or more of a synchronization signal, a broadcast signal, a discovery signal and a pilot signal, not receive the power saving instruction signal on the frequency-domain transmission resources.

In a possible implementation, the frequency-domain transmission resources are different from the frequency-domain transmission resources for transmitting data; or, the frequency-domain transmission resources are obtained by switching frequency-domain transmission resources for transmitting data.

In a possible implementation, the receiving device is further configured to receive a first switching instruction transmitted by the network device; the processing device is further configured to switch from the frequency-domain transmission resources for data transmission onto the frequency-domain transmission resources configured for the terminal to receive the power saving instruction signal according to the first switching instruction.

Alternatively, the receiving device is further configured to receive a second switching instruction transmitted by the network device; or, the processing device is further configured to switch from the frequency-domain transmission resources for receiving the power saving instruction signal to the frequency-domain transmission resources for data transmission according to the second switching instruction.

In a possible implementation, a BWP for transmitting the power saving instruction signal is different from a BWP for transmitting data; or, the BWP for transmitting the power saving instruction signal is obtained by switching the BWP for transmitting data.

In a possible implementation, the terminal is in an idle state or inactive state, and the receiving device is further configured to receive a wake-up instruction signal on the BWP or receive the wake-up instruction signal in at least one beam direction; or, the terminal is in a connected state, and the receiving device is further configured to receive the power saving instruction signal in a beam direction where the terminal resides.

In a possible implementation, the processing device is further configured to determine one beam direction for the wake-up instruction signal transmitted in at least one beam direction; the receiving device is further configured to receive the wake-up instruction signal in the determined beam direction.

In a possible implementation, the wake-up identifiers of the terminals to be awakened are the same; the receiving device is further configured to receive the indication information for updating the wake-up identifier transmitted by the network device; where the indication information carries the configured wake-up identifier; the processing device is further configured to update the wake-up identifier of the terminal to be awakened to the configured wake-up identifier according to the indication information.

In a possible implementation, the receiving device is further configured to acquire configurations for turning on or off of a wake-up indication mode configured by the network device for the terminal to be awakened; the processing device is further configured to configure the wake-up indication mode of the terminal to be awakened according to the configured turning on or off of the wake-up indication mode; the turning on of the wake-up indication mode instructs the terminal to be awakened to monitor a PDCCH according to the power saving instruction signal when the DRX cycle starts; and the turning off of the wake-up mode instructs the terminal to be awakened to monitor the PDCCH when the DRX cycle starts; or, the turning on of the wake-up indication mode instructs the terminal to be awakened to monitor the power saving instruction signal before receiving a paging signal; and the turning off of the wake-up mode instructs the terminal to be awakened to directly monitor a PDCCH of the paging signal without detecting the power saving instruction signal before receiving the paging signal.

In a possible implementation, the receiving device is further configured to acquire the configurations for turning on or off of the wake-up indication mode configured by the network device for the terminal to be awakened through any one of broadcast information, semi-static signaling or dynamic signaling.

A network device of an embodiment of the present application includes: a processor, a memory, a transceiver, and a bus interface, where the processor, the memory and the transceiver are connected through the bus interface; the processor is configured to read one or more executable programs stored in the memory and perform the following operations: determining a wake-up identifier of a terminal to be awakened; where the terminal to be awakened is a terminal that needs to be awakened during a DRX cycle; and the wake-up identifier is configured by the network device for at least one terminal to be awakened; generating a power saving instruction signal according to the wake-up identifier, and transmitting the power saving instruction signal; where the power saving instruction signal instructs the terminal to be awakened to monitor a PDCCH during the DRX cycle.

In a possible implementation, the processor is configured to read software programs in the memory and perform any one of the methods provided by the embodiments of the present application.

An embodiment of the present application provides a terminal including: a processor, a memory, a transceiver, and a bus interface, where the processor, the memory and the transceiver are connected through the bus interface; the processor is configured to read one or more executable programs stored in the memory and perform the following operations: receiving a power saving instruction signal transmitted by a network device; where the terminal to be awakened is a terminal that needs to be awakened during a DRX cycle; and the wake-up identifier is configured by the network device for at least one terminal to be awakened; monitoring a PDCCH in the DRX cycle according to the power saving instruction signal after determining that a wake-up identifier carried in the power saving instruction signal is equal to its own wake-up identifier.

In a possible implementation, the processor is configured to read software programs in the memory and perform any one of the methods provided by the embodiments of the present application.

An embodiment of the present application provides a computer readable storage medium including computer readable instructions. When a computer reads and executes the computer readable instructions, the computer is caused to perform any one of the methods provided by the embodiments of the present application.

An embodiment of the present application provides a computer program product including computer readable instructions. When a computer reads and executes the computer readable instructions, the computer is caused to perform any one of the methods provided by the embodiments of the present application.

BRIEF DESCRIPTION OF THE DRAWINGS

In order to illustrate the technical solutions in the embodiments of the present application more clearly, the accompanying figures of the embodiments of the present application will be introduced below briefly. Obviously the accompanying figures introduced below are only some embodiments of the present application.

DETAILED DESCRIPTION OF THE EMBODIMENTS

Figure 1:
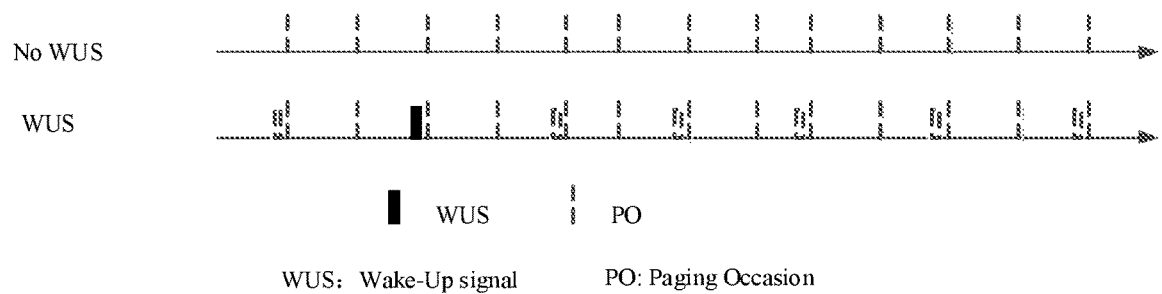
FIG. 1 is a schematic diagram of a signal transmission provided by an embodiment of the present application.

In order to make the purposes, technical solutions and advantages of this application clearer, the technical solutions in the embodiments of the present application will be described clearly and completely below in combination with the accompanying drawings in the embodiments of the present application. Obviously the described embodiments are a part of the embodiments of the disclosure but not all the embodiments.

The embodiments of the present application can be applied to various communication systems, for example, New Radio (NR) system, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), evolved Long Term Evolution (eLTE) system, future communication systems and other communication systems, which are not specifically limited here.

Specifically, in order to provide users with voice and/or data connectivity, the terminal device in the embodiments of the present application is a device with wireless transceiving function or a chip that can be installed in the device. The terminal device can communicate with one or more core networks via a Radio Access Network (RAN). The terminal device may be: a mobile phone, a tablet PC (Pad), a computer with wireless transceiving function, a Personal Digital Assistant (PDA), a Virtual Reality (VR) terminal, an Augmented Reality (AR) terminal, a wireless terminal in the industrial control, a wireless terminal in the self driving, a wireless terminal in the remote medical, a wireless terminal in the smart grid, a wireless terminal in the transportation safety, a wireless terminal in the smart city, a wireless terminal in the smart home, etc. The embodiments of the present application do not limit the application scenarios. In the present application, the above-mentioned terminal device and the chip installed in the above-mentioned terminal device are collectively referred to as terminal device. The terminal device in the embodiments of the present application may also be referred to as User Equipment (UE), user terminal, access terminal, user device, user station, mobile station, mobile, remote station, remote terminal, mobile device, terminal, wireless communication device, user agent or user apparatus.

The network device is a device with wireless transceiving function or a chip that can be installed in the device. The network device can be used to perform the interconversion between the received air frame and the IP packet, acts as a router between the terminal device and the rest of the access network, and can also be used to coordinate the attribute management of the air interface. This device includes but not limited to: a satellite, a gateway station, an evolved Node B (eNB), a Radio Network Controller (RNC), a Node B (NB), a Base Station Controller (BSC), a Base Transceiver Station (BTS), a home base station (for example, home evolved NodeB or Home Node B (HNB)), a Base Band Device (BBU), an Access Point (AP) in Wireless Fidelity (Wi-Fi) system, a wireless relay node, a wireless backhaul node, a Transmission and Reception Point (TRP) or a Transmission Point (TP), etc., or may be a gNB or transmission point (TRP or TP) in the 5G (NR) system, one antenna panel or a group of antenna panels (including a plurality of antenna panels) of the base station in the 5G system, or may be a network node constituting the gNB or transmission point, such as a BBU, or a Distributed Device (DU) under the DU-CU architecture, etc.

The network architectures and service scenarios described in the embodiments of the present application are intended to illustrate the technical solutions of the embodiments of the present application more clearly, and do not constitute a limitation on the technical solutions provided in the embodiments of the present application. With the evolution of network architectures and the emergence of new service scenarios, the technical solutions provided in the embodiments of the present application are also applicable to similar technical problems.

Some scenarios in the embodiments of the present application are illustrated by taking a scenario where the wireless communication network is the NR system network as an example. It should be noted that the solutions in the embodiments of the present application can also be applied to other wireless communication networks, and the corresponding names can also be replaced with the names of corresponding functions in other wireless communication networks.

In the current NR (5G) system, the working states of a terminal can be divided into idle state (RRC_IDLE), inactive state (RRC_Inactive) and connected state (RRC-connected).

When the terminal is in the connected state, it needs to continuously monitor the PDCCH to learn the transmission information of the Physical Downlink Shared Channel (PDSCH). The packet-based data stream is usually bursty, and there is data transmission for a period of time, but there may be no data transmission for a next long period of time. Therefore, the continuous monitoring of the PDCCH causes the unnecessary power consumption of the terminal.

Figure 2:
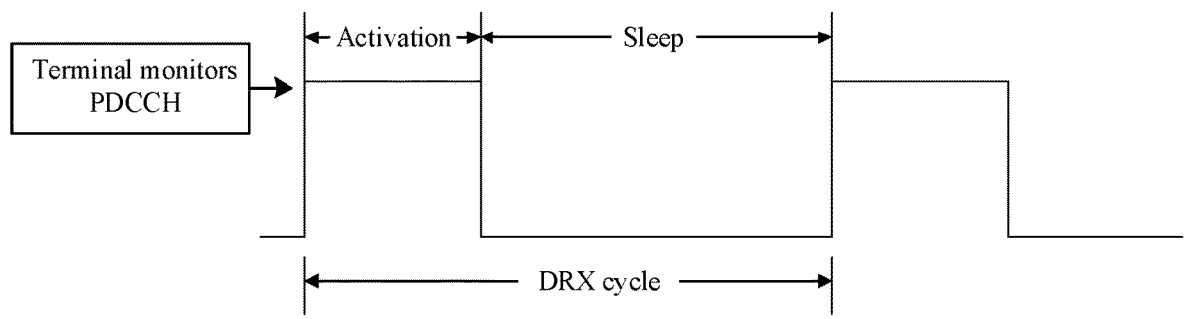
FIG. 2 is a schematic diagram of a signal transmission provided by an embodiment of the present application.

When the terminal is in the connected state, the DRX cycle can be configured for the terminal to reduce the power consumption. As shown in FIG. 2, in the DRX cycle, the terminal can monitor the PDCCH only in the activate time ("On" duration) of the DRX cycle, and the terminal does not monitor the PDCCH in the sleep time (opportunity for DRX, i.e., "Off" duration) of the DRX cycle to reduce the power consumption.

However, in order to quickly respond to the scheduling of the network device and reduce the delay of the terminal, it may be difficult to set a long sleep time in the DRX cycle in the mobile communication system, and it is necessary for the terminal to switch the activation and sleep of the DRX cycle frequently, which cannot achieve the purpose of reducing the power consumption better.

Therefore, there is an urgent need for a signal transmitting and receiving method, so as to solve the problem of optimizing the DRX cycle of the terminal to reduce the power consumption of the terminal in the prior art.

In an embodiment, the network device may instruct the terminal to monitor whether there is a power saving instruction signal on the resources for the power saving instruction signal by the method of sending a power saving instruction signal to each terminal; and if a power saving instruction signal is monitored, the terminal wakes up in the DRX cycle specified by the power saving instruction signal, and still keeps the sleep state in the DRX cycles during which no power saving instruction signal is received, thereby reducing the power consumption.

It should be noted that, in the embodiments of the present application, the power saving instruction signal and the wake-up instruction signal (WUS) can be regarded as the equivalent description, and will not be distinguished later.

When the network device configures the DRX cycle for the terminal, the power saving instruction signal for waking up the terminal is sent for each terminal. The network device may assign terminal identifiers to terminals during the random access process, where the terminal identifiers correspond to the terminals one by one. For example, in the LTE paging process, the terminal identifier may be an International Mobile Subscriber Identity (IMSI) mod 1024, so the terminal identifiers may have a one-to-one correspondence with IMSIs.

If it is necessary to wake up a large number of terminals at the same time, the network device needs to allocate resources for transmitting a plurality of power saving instruction signals to the terminals and transmit a plurality of power saving instruction signals, which takes up a lot of resources.

Figure 3:
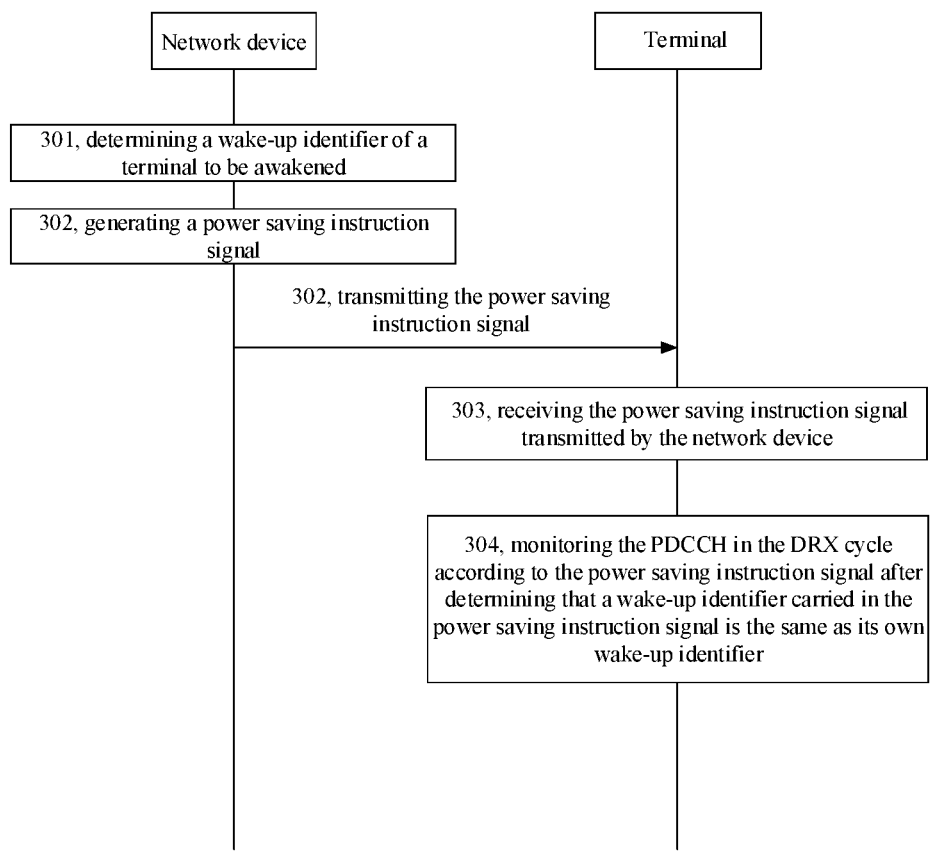
FIG. 3 is a schematic flowchart of a method for transmitting and receiving a signal provided by an embodiment of the present application.

In order to further optimize the configuration of the power saving instruction signal, as shown in FIG. 3, an embodiment of the present application provides a method for transmitting a signal, including the following steps.

Step 301, a network device determining a wake-up identifier of a terminal to be awakened.

In this case, the terminal to be awakened is a terminal that needs to be awakened during a DRX cycle; and the wake-up identifier is a wake-up identifier configured by the network device for at least one terminal to be awakened.

Step 302, the network device generating a power saving instruction signal according to the wake-up identifier, and transmitting the power saving instruction signal.

The power saving instruction signal instructs the terminal to be awakened to monitor a PDCCH during the DRX cycle.

Step 303, the terminal to be awakened receiving the power saving instruction signal transmitted by the network device.

Step 304, the terminal to be awakened monitoring the PDCCH during the DRX cycle according to the power saving instruction signal after determining that a wake-up identifier carried in the power saving instruction signal is the same as its own wake-up identifier.

In the embodiments of the present application, the power saving instruction signal can be distinguished by different sequences and code division, or can be distinguished by time division, frequency division or space division, which is not specifically limited in the present application.

It should be noted that the types of the PDCCH described in the embodiments of the present application includes but not limited to: Narrowband Physical Downlink Control Channel (NPDCCH), Machine-type communication Physical Downlink Control Channel (MPDCCH), enhanced Physical Downlink Control Channel (ePDCCH).

In step 301, the wake-up identifier of the terminal to be awakened determined by the network device may be configured by the network device for the terminal when the terminal accesses the network, or configured by the network device for the terminal when determining that the terminal needs to be awakened.

In a possible implementation, the wake-up identifier is assigned by the network device to at least one terminal to be awakened as needed (i.e., On-Demand WUS ID).

Specifically, before the network device determines the wake-up identifier of the terminal to be awakened, the method further includes as follows.

Step 1, the network device assigns a same wake-up identifier for at least one terminal to be awakened.

Step 2, the network device transmits the wake-up identifier to the at least one terminal to be awakened through semi-static signaling.

Step 3, the terminal to be awakened receives the wake-up identifier through semi-static signaling.

Step 4, the terminal to be awakened determines the received wake-up identifier as the wake-up identifier of the terminal to be awakened.

In the prior art, when a network device sends a wake-up instruction signal to a terminal, the network device sets the identifier according to the value determined after performing the modulus operation on the terminal identifier of the terminal. Since the terminal identifier is fixed and the method for determining the identifier is also fixed, so the network device cannot arbitrarily allocate according to needs. When the wake-up instruction signal is sent according to the identifier allocated by the network device to the terminal, the unnecessary resources are wasted and the scheduling is not flexible enough.

In the embodiments of the present application, the network device assigns the same wake-up identifier to at least one terminal to be awakened, meaning that the network device can assign at least one wake-up identifier to at least one terminal according to actual needs, that is, the number of terminals corresponding to each wake-up identifier is not limited, and the number of wake-up identifiers assigned by the network device is not limited.

In the solutions in the embodiments of the present application, for the terminal in the connected state in the NR system, a wake-up identifier is assigned to the terminal as required, and the power saving instruction signal is generated according to the wake-up identifier; multiple terminals correspond to one wake-up identifier, so that the multiple terminals can be awakened by using fewer power saving instruction signals as needed, reducing the resources consumed by the network device in transmitting the power saving instruction signals and lowering the system overhead. For the terminal in the connected state, the power saving instruction signal can be transmitted flexibly as needed, so as to flexibly control the terminal to wake up in the required DRX cycle, and then effectively reduce the number of times the terminal frequently monitors the power saving instruction signal or frequently wakes up in the DRX cycle due to the reception of the power saving instruction signal, and effectively reduce the power consumption of the terminal.

In a specific implementation process, before the network device determines the wake-up identifier of the terminal to be awakened, the method further includes: if the network device determines that the terminal to be awakened has no wake-up identifier, the network device configuring a wake-up identifier for the terminal to be awakened or setting the wake-up identifier of the terminal to be awakened as a dedicated identifier.

Here, the field of the dedicated identifier may be empty or a fixed value, which is not limited here.

The network device can assign a unique wake-up identifier to each terminal. In a possible implementation, the network device can pre-assign wake-up identifiers for all terminals of the network device. Of course, the network device can also assign a wake-up identifier before it needs to transmit a power saving instruction signal to the terminal.

In a possible implementation, the network device assigns a wake-up identifier to the terminal, which may include as follows.

Step 1, the network device transmits the configured wake-up identifier to the terminal to be awakened.

Step 2, the terminal to be awakened receives the wake-up identifier transmitted by the network device.

In a specific implementation process, the network device may assign the wake-up identifier to the terminal to be awakened in various ways, including via broadcast information (e.g., system information), dynamic signaling (e.g., PDCCH), semi-static signaling (e.g., RRC signaling), and the like.

In a specific implementation process of step 302, each wake-up identifier corresponds to one power saving instruction signal.

In step 301, the network device may configure at least one wake-up identifier for the terminal that needs to be awakened in the DRX cycle as required. The number of wake-up identifiers can be less than a preset value to save the configuration resources.

In order to save the resources for sending power saving instruction signals, the network device may configure one wake-up identifier for the terminals that wake up in the DRX cycle, that is, the wake-up identifiers of K terminals that need to be awakened in the DRX cycle are the same wake-up identifier. K is a positive integer greater than or equal to 1.

Specifically, the network device may simultaneously assign the same wake-up identifier to multiple terminals, and may also assign the same wake-up identifier to all the terminals that need to be awakened in the cell.

In a possible implementation, the configuration mode of the wake-up identifier may be semi-static configuration, and the step in which the network device determines the wake-up identifier of the terminal to be awakened includes: the network device determining whether wake-up identifiers of terminals to be awakened are the same; and if not, configuring the same wake-up identifier for the terminals to be awakened.

In a specific implementation process, the network device may configure the same wake-up identifier for the terminal to be awakened, which may include the following steps.

Step 1, the network device transmits the instruction information for updating the wake-up identifier to the terminal to be awakened; where the instruction information carries the configured wake-up identifier.

Step 2, the terminal to be awakened receives the indication information for updating the wake-up identifier transmitted by the network device; where the indication information carries the configured wake-up identifier.

Step 3, the terminal to be awakened updates the wake-up identifier of the terminal to be awakened according to the indication information.

For example, before a wake-up cycle, the network device needs to schedule K terminals at the same time, and the power saving instruction signals of the K terminals are transmitted on the same time-frequency resources. At this time, the network device can assign the same wake-up identifier to the K terminals, and the network device can wake up the K terminals simply by transmitting only one power saving instruction signal, saving the signal resources effectively.

For another example, in a scenario, the network device needs to wake up all the terminals to receive the emergency information, e.g., receive earthquake and tsunami warning system. There is only a need for the network device to configure the wake-up identifiers of all the terminals as the same value in advance, and the network device only needs one power saving instruction signal to wake up all the terminals.

In another scenario, the network device needs to wake up fewer terminals at the same time. In this case, the network device can assign different wake-up identifiers to the terminals. When a terminal needs to be awakened, the network device can generate a power saving instruction signal according to the wake-up identifier of the terminal. This power saving instruction signal may be scrambled according to the wake-up identifier, so that only the terminal configured with the wake-up identifier can correctly parse the power saving instruction signal.

For example, the terminals that need to be awakened in the DRX cycle are K terminals, and the wake-up identifiers of the K terminals can be set as two wake-up identifiers.

If a large number of terminals need to be awakened in the DRX cycle, and the network device cannot configure the same time-frequency resources for K terminals to transmit the power saving instruction signals, the wake-up identifiers of K terminals can be set as multiple wake-up identifiers, and one time-frequency resource is set corresponding to each wake-up identifier to transmit a power saving instruction signal.

In a scenario, the network device needs to wake up different terminals in different DRX cycles. In this case, multiple wake-up identifiers can be set according to different DRX cycles.

In another scenario, according to multiple wake-up identifiers, the power saving instruction signals are sent on the same time-domain transmission resource but different frequency-domain resources; and the power saving instruction signal wakes up the terminal corresponding to the wake-up identifiers in different DRX cycles to reduce the transmission delay.

The embodiment of the present application can configure the wake-up identifier for the terminal flexibly and then configure the transmission of the power saving instruction signal flexibly, thereby effectively reducing the number of times the terminal wakes up frequently due to the reception of the power saving instruction signal, and effectively reducing the power consumption of the terminal.

Before step 302, the network device may allocate the time-frequency transmission resources for the power saving instruction signal corresponding to the terminal to be awakened according to actual needs.

In a possible implementation, the time-frequency resources can be independent of the wake-up identifier, that is, multiple terminals to be awakened can be configured with the same time-frequency transmission resources. The same time-frequency transmission resources are configured to transmit the power saving instruction signals corresponding to the terminals to be awakened, and the allocated time-frequency transmission resources are open to all the terminals.

In a specific implementation process, the time-frequency transmission resources for transmitting the power saving instruction signal may correspond to a sequence set; and in the NR scenario, one power saving instruction signal may correspond to one multi-level sequence, or may be a specially-defined PDCCH, which is scrambled by the wake-up identifier.

The embodiments in which the network device assigns the time-domain transmission resources to the terminal will be described below.

In a possible implementation, before the network device transmits the power saving instruction signal, the method includes: the network device configuring time-domain transmission resources for the terminal. The time-domain transmission resources correspond to the DRX cycle; and the time-domain transmission resources include the distance between the power saving instruction signal and a start point of the DRX cycle, and/or a maximum time occupied by the power saving instruction signal, and/or the time occupied by the power saving instruction signal.

It should be noted that the fact that the time-domain transmission resources correspond to the DRX cycle may be: the time-domain transmission resources correspond to one DRX cycle, or correspond to N continuous DRX cycles, or correspond to N discontinuous DRX cycles, which is not limited here.

In a specific implementation process, the DRX cycles may be N continuous DRX cycles or N discontinuous DRX cycles.

For example, if it is determined that the DRX cycles may be N continuous DRX cycles, the power saving instruction signal may wake up the terminal that needs to be awakened during the nearest N continuous DRX cycles after the power saving instruction signal.

For another example, the DRX cycle is the $M^{th}$ DRX cycle after the power saving instruction signal; and the N and M are positive integers greater than or equal to 1.

Corresponding to the scenario where N and M are greater than 1, the network device can semi-statically notify the terminal of the specific value of N or M through broadcast information, dynamic signaling, or semi-static signaling and so on.

Through the above setting method, the power saving instruction signal can be flexibly set, the number of times of sending the power saving instruction signal is reduced, and the power consumption of the terminal for receiving the power saving instruction signal is further reduced.

In a specific implementation process, for a terminal in the idle state, the time-domain transmission resources of the power saving instruction signal correspond to the PO position. The corresponding manner may be: the time-domain transmission resources correspond to one PO position, or may correspond to N continuous PO positions or N discontinuous PO positions.

For the terminal in the idle state, there is a one-to-one correspondence between wake-up instruction signals and PO positions, and the start points of the DRX cycles of different terminals in the same cell are aligned, so the distance between the WUS and PO is fixed for multiple terminals that need to be awakened in each PO, while the terminal in idle state cannot transmit the high-level signaling through PDSCH. Thus, the distance between WUS and PO of a specific cell can be broadcasted through the System Information (SI). In addition, since the network device has not established an RRC connection with the terminal, the network device configures the start point of the DRX cycle for the terminal according to the broadcast of the cell.

For the terminal in the connected state, the time-domain transmission resources of the power saving instruction signal correspond to the DRX cycle.

Different from the idle state, the power saving instruction signal sent by the network device for the terminal in the connected state can be specific to the UE, so the time-domain transmission resources of the power saving instruction signal configured for the terminal in the connected state and the DRX cycle of the terminal may be set respectively according to the terminal. For example, the distance between the power saving instruction signal and the DRX cycle may be different for each terminal, and the network device may send it to each terminal through different signaling. The network device can also notify all the terminals of the same distance between a power saving instruction signal and the DRX cycle through broadcast signaling. Therefore, the start points of the DRX cycles of different terminals may not be aligned, so that the start points or end points of the power saving instruction signals of different terminals cannot be aligned. Thus, it is necessary to configure, for each terminal, the time-domain transmission resources of the power saving instruction signal.

In order to prevent the terminal from blindly detecting the power saving instruction signal at different times, in a possible implementation, before the network device transmits the power saving instruction signal, the method further includes: the network device can configure the distance between the power saving instruction signal and the start point of the DRX cycle for the terminal through dynamic signaling or semi-static signaling.

Here, the semi-static signaling may be RRC signaling, and the dynamic signaling may be PDCCH.

Specifically, for each terminal, the network device can configure the distance between the power saving instruction signal and the start point of the DRX cycle, where the distance between the power saving instruction signal and the start point of the DRX cycle may be the distance between the start point of activation (on) of the DRX cycle and the start point of the power saving instruction signal, or the distance between the start point of activation (on) of the DRX cycle and the end point of the power saving instruction signal.

Regarding the configuration way of the maximum time occupied by the power saving instruction signal and/or the time occupied by the power saving instruction signal, in a possible implementation, before the network device transmits the power saving instruction signal, the method further includes following steps.

Step 1, the network device can notify the maximum time occupied by the power saving instruction signal through broadcast information.

Step 2, the terminal can receive the maximum time occupied by the power saving instruction signal through broadcast information.

Here, the broadcast information may be system information.

In a possible implementation, before the network device transmits the power saving instruction signal, the method further includes the following steps.

Step 1, the network device can configure the time occupied by the power saving instruction signal for each terminal through semi-static signaling or dynamic signaling.

Step 2, the terminal can receive the time occupied by the power saving instruction signal configured by the network device for each terminal through semi-static signaling or dynamic signaling.

Here, the semi-static signaling may be RRC signaling, and the dynamic signaling may be PDCCH.

It should be noted that, assuming that the power saving instruction signal occupies a subframe or slot, in order to enhance the coverage, the basic power saving instruction signal with subframe or slot as the basic device will be repeatedly transmitted, and the maximum time occupied by the power saving instruction signal can be preset; this can be consistent for all the terminals, and can be notified to all the terminals through broadcast information.

Specifically, the transmission length of the power saving instruction signal sent each time can be changed, and the length can be configured separately according to the terminal. Therefore, the time period occupied by the power saving instruction signal can be notified to the terminal in time through RRC signaling or PDCCH.

After the network device configures the time-domain transmission resources, a possible implementation includes the following steps.

Step 1, the network device transmits the power saving instruction signal on the time-domain transmission resources.

Step 2, the terminal to be awakened receives the power saving instruction signal on the time-domain transmission resources.

In the embodiments of the present application, the allocation of the time-frequency transmission resources of the power saving instruction signal of the terminal can be set as required. For the terminal, the time-frequency transmission resources can be flexibly configured for the terminal to be awakened as required, and then the flexible transmission of the power saving instruction signal can be flexibly configured, effectively reducing the number of times the terminal frequently monitors the power saving instruction signal or frequently wakes up in the DRX cycle due to the reception of the power saving instruction signal, and effectively reducing the power consumption of the terminal.

The embodiments in which the network device assigns the frequency-domain transmission resources to the terminal will be described below. The positions of the frequency-domain transmission resources of the power saving instruction signal may be pre-agreed or allocated by means of signaling notification. In the embodiments of the present application, the scheduling flexibility of the power saving instruction signal is improved by various allocation methods.

In a possible implementation, the frequency-domain transmission resources configured by the network device for the power saving instruction signal may be different from the frequency-domain transmission resources for data transmission.

In the first aspect, the positions of the preset frequency-domain transmission resources allocated by the network device to the terminal may be fixed in advance.

In a specific implementation process, before the network device determines the wake-up identifier of the terminal to be awakened, the method further includes: the network device pre-configures the preset frequency-domain transmission resources for the terminal according to a preset rule.

Here, the preset rule may be: the preset frequency-domain transmission resources correspond to the terminal identifier of the terminal.

The terminal identifier (UE ID) is assigned by the network device to the terminal in order to distinguish the terminal, and each terminal identifier corresponds to one terminal. For example, in the random access process, the network device assigns a terminal identifier to the terminal, and the network device will notify the Timing Advance (TA) of the uplink transmission corresponding to the terminal identifier. The preset frequency-domain transmission resources may be at least one frequency-domain transmission resource allocated for the terminal to transmit the power saving instruction signal.

Of course, it is also possible that the preset frequency-domain transmission resources correspond to the wake-up identifier of the terminal, and the set rule may also be to prioritize the allocation of the same frequency-domain transmission resources for the terminals to be awakened. The specific preset rule may be set as needed, and is not limited here.

In a possible implementation, the terminal identifier of the terminal has a corresponding relationship with the frequency-domain transmission resources. The frequency-domain transmission resources of the power saving instruction signals of multiple terminals may correspond to one frequency-domain transmission resource.

In order to wake up multiple terminals at the same time, if the multiple terminals correspond to at least one frequency-domain transmission resource, at least one power saving instruction signal needs to be transmitted. The specific number of power saving instruction signals transmitted can be determined according to the number of frequency-domain transmission resources configured for the terminals.

Specifically, the network device may semi-statically configure the frequency-domain transmission resources for transmitting at least one power saving instruction signal for the terminal.

With the above method, different terminals can receive power saving instruction signals on different frequency-domain transmission resources. The frequency-domain transmission resources for transmitting the power saving instruction signal to the terminal may be allocated after the terminal enters the connected state, and then only one signaling is required to notify the terminal of the frequency-domain transmission resources allocated for the power saving instruction signal. There may be no need to send the signaling of the frequency-domain transmission resources allocated for the terminal every time before the power saving instruction signal is transmitted, so the signaling sent by the network device to the terminal can be saved.

In the second aspect, in an embodiment of the present application, the frequency-domain transmission resource may be a position pre-fixed by the network device, and the method may further include the following steps.

Step 1, the network device configures the preset frequency-domain transmission resources for the terminal to be awakened; where the preset frequency-domain transmission resources are used by the network device to transmit the power saving instruction signal.

Step 2, the network device transmits the preset frequency-domain transmission resources to the terminal to be awakened through semi-static signaling.

Step 3, the terminal to be awakened receives the preset frequency-domain transmission resources configured by the network device for the terminal to be awakened through semi-static signaling.

The preset frequency-domain transmission resources can be allocated according to the terminal identifier or according to the wake-up identifier, and used by the network device to transmit the power saving instruction signal; the frequency-domain transmission resources are not limited to be allocated for the terminal to be awakened, and may be the frequency-domain transmission resources dedicated to transmitting the power saving instruction signal. After the network device determines the terminals that need to be awakened and determines the wake-up identifiers of the terminals to be awakened, and before the network device transmits the power saving instruction signal, the network device can allocate the frequency-domain transmission resources to these terminals that need to be awakened, and notify the terminals that need to be awakened through semi-static signaling.

With the above method, the terminal that needs to be awakened can be allocated to fewer frequency-domain transmission resources and fewer wake-up identifiers sufficiently flexibly before the DRX cycle, so as to wake up the terminal that needs to be awakened with fewer power saving instruction signals, and greatly reduce the power consumption of the terminal.

In the third aspect, the frequency-domain transmission resources configured by the network device for the terminal to be awakened are not pre-allocated, but are configured flexibly according to resource scheduling requirements before the terminal needs to be awakened as needed. This configuration method is more flexible and improves the resource utilization rate.

In a specific implementation, before the network device transmits the power saving instruction signal, the method further includes the following steps.

Step 1, the network device assigns the frequency-domain transmission resources to the terminal to be awakened, and transmits the configuration information carrying the frequency-domain transmission resources to the terminal to be awakened.

Here, the rule for the network device to assign the frequency-domain transmission resources to the terminal to be awakened can be flexibly configured according to resource scheduling requirements before the terminal needs to be awakened as needed. The frequency-domain transmission resources are not limited to the frequency-domain transmission resources dedicated to transmitting power saving instruction signals, but can also be switched from the frequency-domain transmission resources for transmitting data, thereby improving the resource utilization rate and improving the flexibility of the network device to schedule terminals. The specific embodiment may be to determine the assigned frequency-domain transmission resources according to the wake-up identifier, which is not limited here. For example, the network device may configure the frequency-domain transmission resources of multiple terminals to be awakened as one frequency-domain transmission resource, so as to save the number of power saving instruction signals transmitted, and thus reduce the power consumption of the terminal.

Step 2, the network device transmits the frequency-domain transmission resources to the terminal to be awakened through semi-static signaling.

Here, the frequency-domain transmission resources are for the network device transmitting the power saving instruction signal to the terminal to be awakened.

Step 3, the terminal to be awakened receives the frequency-domain transmission resources configured by the network device through semi-static signaling.

With the above method, the terminal that needs to be awakened can be allocated with least frequency-domain transmission resources and least wake-up identifiers sufficiently flexibly before the DRX cycle, so as to wake up the terminal that needs to be awakened with least power saving instruction signals, greatly reduce the power consumption of the terminal, and improve the scheduling flexibility of the network device.

In a possible implementation, after the network device configures the frequency-domain transmission resources for the terminal to be awakened, the frequency-domain transmission resources or the preset frequency-domain resources are configured in the following way.

Step 1, the network device transmits a first configuration signaling carrying the wake-up identifier and the frequency-domain transmission resources to the terminal to be awakened; or, the network device transmits a first configuration signaling carrying the wake-up identifier and the preset frequency-domain transmission resources to the terminal to be awakened.

Step 2, the terminal to be awakened receives the first configuration signaling transmitted by the network device.

In a specific implementation process, the first configuration signaling may be semi-static signaling, dynamic signaling, or wake-up identifier, where the semi-static signaling may be RRC signaling, and the dynamic signaling may be PDCCH.

With the above method, the configuration of the frequency-domain transmission resources is sufficiently flexible, so that the terminals that need to be awakened are allocated to the same resources corresponding to the same wake-up identifier before the DRX cycle, greatly reducing the power saving instruction signals that need to be transmitted.

In a possible implementation, after the network device configures the frequency-domain transmission resources for the terminal to be awakened, the frequency-domain transmission resources are configured in the following way.

Step 1, the network device transmits a second configuration signaling carrying the frequency-domain transmission resources to the terminal to be awakened; or, the network device transmits a second configuration signaling carrying the preset frequency-domain transmission resources to the terminal to be awakened.

Step 2, the terminal to be awakened receives the second configuration signaling transmitted by the network device.

Here, the second configuration signaling may be semi-static signaling or dynamic signaling, such as RRC signaling or PDCCH.

In a possible implementation, after the network device configures the frequency-domain transmission resources for the terminal to be awakened, the frequency-domain transmission resources are configured in the following way.

Step 1, the network device transmits a third configuration signaling carrying the wake-up identifier to the terminal to be awakened.

Step 2, the terminal to be awakened receives the third configuration signaling transmitted by the network device.

Here, the third semi-static signaling may be semi-static signaling, e.g., RRC signaling.

In a specific implementation process, the network device can allocate multiple frequency-domain resources to different terminals through semi-static signaling, such as RRC signaling, for transmitting the power saving instruction signals. The semi-static signaling includes one or more of the number of frequency-domain transmission resources, the sequence numbers of the frequency-domain transmission resources, and the location information of the frequency-domain transmission resources, such as center frequency point. The network device can also allocate multiple frequency-domain resources to different terminals based on the mapping of their terminal identifier.

Specifically, the network device broadcasts the frequency-domain transmission resources of the power saving instruction signal through the SI, and then defines the functional relationship between terminals and frequency-domain transmission resources of power saving instruction signals.

For example, the network device may use a part of bits (such as L bits) of the terminal identifier constituted by P binary bits to indicate the sequence index of the frequency-domain transmission resources of the power saving instruction signal used by the terminal, where these L bits may be located at the head or tail of P bits or at certain pre-agreed positions.

It should be noted that, in order to avoid the wake-up indication interference between adjacent cells as much as possible, the network device may configure different frequency-domain transmission resources of power saving instruction signals for terminals in adjacent cells.

In a specific embodiment, the step in which the network device configures the frequency-domain transmission resources for the terminal to be awakened includes: the network device takes one or more of frequency-domain transmission resources of a PDCCH, frequency-domain transmission resources of a synchronization signal, and frequency-domain transmission resources of a PRACH of the terminal to be awakened as the frequency-domain transmission resources configured by the network device for the terminal to be awakened.

In a possible implementation, the frequency-domain transmission resources corresponding to the power saving instruction signal configured by the network device for the terminal may be a function of transmission frequency-domain resources of the PDCCH or transmission frequency-domain resources of the synchronization signal or frequency-domain transmission resources of the PRACH of the terminal. The specific function may not be limited. For example, the function can be an offset, and the network device only needs to notify the terminal of the offset value through signaling.

In a possible implementation, the frequency-domain resources may also be one or more of frequency-domain transmission resources of a PDCCH, frequency-domain transmission resources of a synchronization signal, and frequency-domain transmission resources of a PRACH of the terminal to be awakened.

At this time, the frequency-domain transmission resources of the power saving instruction signal may conflict with the transmission resources of the following signals: for example, the synchronization signal (Synchronization Signal Block, SSB) that contains the Primary Synchronization Signal (PSS), the Secondary Synchronization Signal (SSS) or Physical Broadcast Channel (PBCH) signal or SI; or the pilot signal or the discovery signal, etc. In order to avoid the interference on the performance of the terminal that does not process the power saving instruction signal in the original system, when the frequency-domain transmission resources of the power saving instruction signal conflicts with the synchronization signal or the broadcast signal or the discovery signal or the pilot signal, the transmission of the power saving instruction signal is stopped.

In a specific implementation process, the following steps are also included.

Step 1, the network device does not transmit the power saving instruction signal on the frequency-domain transmission resources if it determines that the power saving instruction signal to be transmitted on the frequency-domain transmission resources collide with one or more of a synchronization signal, a broadcast signal, a discovery signal and a pilot signal.

Step 2, the terminal does not receive the power saving instruction signal on the frequency-domain transmission resources.

In a possible implementation, after the network device configures the frequency-domain transmission resources for the terminal, the method further includes the following steps.

Step 1, the network device transmits the power saving instruction signal on the frequency-domain transmission resources.

Step 2, the terminal to be awakened receives the power saving instruction signal on the frequency-domain transmission resources.

In a scenario, the terminal is in the idle state, and the terminal may receive the power saving instruction signal through the solution described in the first or second aspect.

In a scenario, after the terminal is awakened into the connected state, the terminal may receive the power saving instruction signal in the corresponding frequency-domain transmission resources in the way described in the third aspect.

In another scenario, if the network device determines that the terminal in the connected state obtains the frequency-domain transmission resources of the power saving instruction signal allocated by the network device in the manner of the first or second aspect, but the frequency-domain transmission resources are currently in a very tight state, it is possible to switch to the manner of the third aspect.

In order to increase the scheduling flexibility of the network device, in a possible implementation, the frequency-domain transmission resources allocated by the network device to the terminal may be obtained by switching the frequency-domain transmission resources for transmitting data.

Specifically, the method may include: the network device notifies the terminal to switch the frequency-domain transmission resources to the frequency-domain transmission resources for receiving the power saving instruction signal allocated by the network device to the terminal before receiving the power saving instruction signal; and the method may further include: the network device notifies the terminal to switch the frequency-domain transmission resources of the terminal to the frequency-domain transmission resources for data transmission so that the terminal receives data after receiving the power saving instruction signal.

In a specific implementation, before the network device transmits the power saving instruction signal, the method may further include the following steps.

Step 1, the network device transmits a first switching instruction to the terminal; where the first switching instruction notifies the terminal to switch to the frequency-domain transmission resources configured for the terminal to receive the power saving instruction signal.

Step 2, the terminal receives the first switching instruction.

Step 3, the terminal determines to receive the power saving instruction signal on the frequency-domain resources configured by the network device for the terminal according to the first switching instruction.

Here, the first switching instruction may be: the dynamic signaling indicates the switching of frequency-domain transmission resources; or the semi-static signaling indicates the switching of frequency-domain transmission resources; or a defined timer, and when the timer expires, the terminal automatically switches to the pre-defined frequency-domain transmission resources to receive the wake-up instruction signal.

Before the network device transmits the power saving instruction signal, the method may further include the following steps.

Step 1, the network device transmits a second switching instruction to the terminal; where the second switching instruction notifies the terminal to switch from the frequency-domain transmission resources for receiving the power saving instruction signal to the frequency-domain transmission resources for data transmission.

Step 2, the terminal receives the second switching instruction.

After the network device transmits the power saving instruction signal, the method further includes: the terminal switches from the frequency-domain transmission resources for receiving the power saving instruction signal to the frequency-domain transmission resources for data transmission according to the second switching instruction.

In the embodiments of the present application, the allocation of the frequency-domain transmission resources of the power saving instruction signal of the terminal can be set as required. For the terminal, the time-frequency transmission resources can be flexibly configured for the terminal to be awakened as required, and then the flexible transmission of the power saving instruction signal can be flexibly configured, effectively reducing the number of times the terminal frequently monitors the power saving instruction signal or frequently wakes up in the DRX cycle due to the reception of the power saving instruction signal, and effectively reducing the power consumption of the terminal.

The network device configures the narrowband frequency-domain transmission resources for the power saving instruction signal, the bandwidth of which can be significantly smaller than the typical bandwidth allocated for data transmission, so as to reduce the power consumption of the terminal.

In a specific application scenario, the network device in the NR system can allocate at least one BWP to the terminal for data transmission. In this case, in a possible implementation, the network device can configure the frequency-domain transmission resources for transmitting the power saving instruction signal on the BWP.

Specifically, the network device assigns the frequency-domain transmission resources to the terminal, where the frequency-domain transmission resources are different from the BWP for transmitting data.

In one embodiment, the network device may configure a narrowband BWP for the power saving instruction signal, and the terminal only activates the narrowband BWP when detecting the power saving instruction signal. The bandwidth of the BWP for transmitting the power saving instruction signal may be less than or equal to the BWP for transmitting data, so as to reduce the power consumption of the terminal when receiving the power saving instruction signal on the BWP.

Optionally, multiple data BWPs may be configured with one same power saving instruction signal BWP, one BWP for transmitting the power saving instruction signal may include multiple frequency-domain transmission resources of the power saving instruction signal, and each terminal may correspond to one power saving instruction signal BWP.

In a possible implementation, the BWP for transmitting the power saving instruction signal is different from the BWP for transmitting data.

Alternatively, the BWP for transmitting the power saving instruction signal is obtained by switching the BWP for transmitting data.

Here, the power saving instruction signal can be transmitted by switching from the data BWP to the non-data BWP.

In an embodiment of the present application, the data BWP may be the BWP occupied by the data transmission corresponding to the power saving instruction signal, and the non-data BWP refers to the BWP different from the BWP occupied by the data transmission corresponding to the power saving instruction signal. With the above method, the power consumption of the terminal when receiving the power saving instruction signal can be saved.

After the terminal works on the data BWP, in order to avoid the time delay caused by switching the BWP frequently, or in the scenario where the frequency-domain transmission resources are limited, in order to save the resource consumption, it is also possible to directly use the BWP for data transmission to transmit the power saving instruction signal.

In a possible implementation, the method further includes: the network device transmits the power saving instruction signal on the beam where the terminal to be awakened resides; where the beam may be used by the terminal to be awakened for data transmission.

After the network device configures the frequency-domain transmission resources for the terminal as the data BWP or non-data BWP, and before the network device transmits the power saving instruction signal, the method further includes the following steps.

Step 1, the network device notifies the terminal to be awakened of the frequency-domain transmission resources configured for the terminal to be awakened through semi-static signaling; where the frequency-domain transmission resources are allocated by the network device to the terminal.

Step 2, the terminal receives the frequency-domain transmission resources through semi-static signaling.

In the existing NB-IoT system, the wake-up instruction signal carries a cell identifier, and the wake-up instruction signal can wake up one cell at a time according to the cell identifier. In the DRX cycle, there are often terminals that need to be served. If a terminal of a cell is awakened each time, the power consumption cannot be saved.

In the NR system, the NR focuses on the large bandwidth, the high-throughput transmission, the support for high-speed movement and the large connections. For the terminals in the idle or inactive state, the base station performs paging and wakeup based on the same cell, which may cause the unnecessary terminals to be awakened, waste the resources of the terminals, and is not conducive to the reduction of power consumption.

In order to reduce the power consumption of the terminal, the method further includes the following steps.

Step 1, the network device transmits a wake-up instruction signal on the BWP if it determines that the terminal is in the idle state or inactive state.

Step 2, the terminal receives the wake-up instruction signal on the BWP.

Here, the BWP may be a narrowband BWP to reduce the power consumption of the terminal when receiving the wake-up instruction signal.

In the NR scenario, in a possible implementation, the method may further include the following steps.

Step 1, the network device transmits the wake-up instruction signal in at least one beam direction if it determines that the terminal is in the idle state or inactive state.

Step 2, the terminal to be awakened receives the wake-up instruction signal in at least one beam direction.

In step 2, the terminal to be awakened may further determine a beam direction according to the wake-up instruction signal received in at least one beam direction, and receive the wake-up instruction signal in the determined beam direction.

With the above method, the wake-up instruction signals that the terminal needs to receive can be reduced, thereby reducing the power consumption of the terminal.

In a specific embodiment, the power saving instruction signal may be a multi-level sequence; and the step 2 may include: the terminal to be awakened determines an optimal beam direction according to at least one sub-sequence of the multi-level sequence of the power saving instruction signal transmitted by the network device in at least one beam direction; and the terminal to be awakened receives the multi-level sequence of the power saving instruction signal in the optimal beam direction.

In the NR scenario, in a possible implementation, the method may further include the following steps.

Step 1, the network device transmits the power saving instruction signal in the beam direction where the terminal to be awakened resides if it determines that the terminal to be awakened is in the connected state.

Step 2, the terminal to be awakened receives the power saving instruction signal in the beam direction where it resides.

In an embodiment of the present application, the network device may configure whether to enable the wake-up indication mode for a terminal that supports the power saving instruction signal.

For the terminals in the connected state, when the wake-up indication mode of the terminal that supports the power saving instruction signal is closed, the terminal no longer receives the power saving instruction signal but works in the non-power saving instruction signal mode, that is, all the terminals in the connected state of which the wake-up indication mode is closed can be awakened without any power saving instruction signal in the DRX cycle. For example, the above embodiment can be used for a network device to send emergency messages, such as earthquake and tsunami warning messages, to all terminals in the cell.

In a specific implementation process, the method further includes the following steps.

Step 1, the network device configures the turning on or off of the wake-up indication mode for the terminal to be awakened.

Step 2, the terminal to be awakened acquires the turning on or off of the wake-up indication mode configured by the network device for the terminal to be awakened.

A specific implementation process of step 2 may include: the network device transmits the turning on or off of the wake-up indication mode configured for the terminal to be awakened to the terminal to be awakened through any one of broadcast, semi-static signaling or dynamic signaling; and the terminal to be awakened acquires the turning on or off of the wake-up indication mode configured by the network device through any one of broadcast information, semi-static signaling or dynamic signaling.

Step 3, the terminal to be awakened configures the wake-up indication mode according to the configured turning on or off of the wake-up indication mode.

For a terminal in the connected state, the turning on of the wake-up indication mode instructs the terminal to be awakened to monitor a PDCCH according to the power saving instruction signal when the DRX cycle starts; and the turning off of the wake-up mode instructs the terminal to be awakened to monitor the PDCCH when the DRX cycle starts.

For a terminal in the idle or inactive state, the turning on or off of the wake-up indication mode can also be set. When the wake-up indication mode is turned off, the terminal does not need to monitor the power saving instruction signal firstly and then detects the paging information, but wakes up directly at the PO position to detect the PDCCH, or detect the PDCCH directly after receiving the indication information that the wake-up indication mode is turned off.

For a terminal in the idle or inactive state, the turning on of the wake-up indication mode instructs the terminal to be awakened to monitor the power saving instruction signal before a paging signal; and the turning off of the wake-up mode instructs the terminal to be awakened to directly monitor the PDCCH of the paging signal without detecting the power saving instruction signal before the paging signal.

With the above method, the wake-up mode of the terminal can be configured more flexibly as needed, to adapt to different requirements of the network device and base station while reducing the power consumption of the terminal.

In the solutions in the embodiments of the present application, for the terminal in the connected state in the NR system, a wake-up identifier is assigned to the terminal as required, and the power saving instruction signal is generated according to the wake-up identifier; multiple terminals correspond to one wake-up identifier, so that the multiple terminals can be awakened by using fewer power saving instruction signals, reducing the resources consumed by the network device in transmitting the power saving instruction signals and lowering the system overhead. For the terminal in the connected state, the power saving instruction signal can be transmitted flexibly as needed, so as to flexibly control the terminal to wake up in the required DRX cycle, and then effectively reduce the number of times the terminal frequently monitors the power saving instruction signal or frequently wakes up in the DRX cycle due to the reception of the power saving instruction signal, and effectively reduce the power consumption of the terminal.

There are many ways to set the wake-up identifier, realizing the more flexible scheduling of the network device. The allocation of the time-frequency transmission resources of the power saving instruction signal of the terminal can be set as required. For the terminal, the time-frequency transmission resources can be flexibly configured for the terminal to be awakened as required, and then the flexible transmission of the power saving instruction signal can be flexibly configured, effectively reducing the number of times the terminal frequently monitors the power saving instruction signal or frequently wakes up in the DRX cycle due to the reception of the power saving instruction signal, and effectively reducing the power consumption of the terminal. For example, when the time-domain transmission resources are configured for the terminal, the network device can notify the time-domain transmission resources configured for the terminal through semi-static signaling according to the corresponding DRX cycle, which realizes the flexible configuration of time-domain transmission resources for the terminal. When the frequency-domain transmission resources are configured for the terminal, the frequency-domain transmission resources can be preset, or the frequency-domain transmission resources can be dynamically configured; and the terminal can be notified of the frequency-domain transmission resources configured for the terminal by way of static configuration or configuration signaling, which realizes the flexible configuration of frequency-domain transmission resources for the terminal. In order to further reduce the power consumption of the terminal, the network device may configure the narrowband frequency-domain transmission resources for the power saving instruction signal, and may also configure the configuration mode of switching to the narrowband frequency-domain transmission resources for the terminal.

In order to support the terminal in the wake-up mode, it is also possible to try to turn on and off the wake-up indication mode, to adapt to more application scenarios, facilitate the flexible scheduling of the terminal by the network device, effectively reduce the number of times the terminal wakes up frequently due to the reception of the power saving instruction signal, and effectively reduce the power consumption of the terminal.

Figure 4:
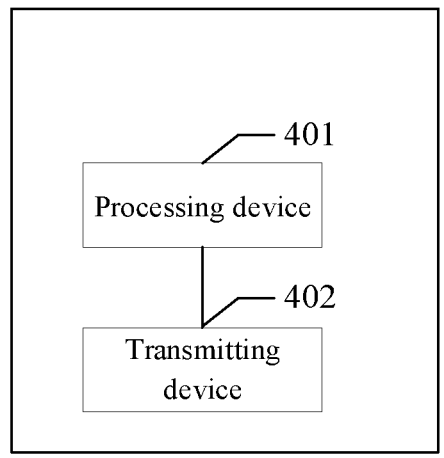
FIG. 4 is a structural schematic diagram of a network device provided by an embodiment of the present application.

Based on the same application concept, as shown in FIG. 4, the present application provides a communication device, including: a processing device 401 configured to determine a wake-up identifier of a terminal to be awakened; where the terminal to be awakened is a terminal that needs to be awakened during a DRX cycle; and the wake-up identifier is a wake-up identifier configured by the network device for at least one terminal to be awakened; and generate a power saving instruction signal according to the wake-up identifier; a transmitting device 402 configured to transmit the power saving instruction signal; wherein the power saving instruction signal instructs the terminal to be awakened to monitor a PDCCH during the DRX cycle.

In a possible implementation, the processing device 401 is further configured to: assign a wake-up identifier to at least one terminal to be awakened; the transmitting device 402 is further configured to transmit the wake-up identifier to the at least one terminal to be awakened through semi-static signaling.

The processing device 401 is further configured to: configure a wake-up identifier for the terminal to be awakened or set the wake-up identifier of the terminal to be awakened as a dedicated identifier when determining that the terminal to be awakened has no wake-up identifier.

In a possible implementation, the DRX cycle includes N continuous DRX cycles or N discontinuous DRX cycles; or, the DRX cycle is the $M^{th}$ DRX cycle after the power saving instruction signal; and the N and M are positive integers greater than or equal to 1.

In a possible implementation, the processing device 401 is further configured to configure time-domain transmission resources for the terminal; where the time-domain transmission resources correspond to the DRX cycle; and the time-domain transmission resources include a distance between the power saving instruction signal and a start point of the DRX cycle, and/or the maximum time occupied by the power saving instruction signal, and/or the time occupied by the power saving instruction signal; the transmitting device 402 is further configured to transmit the power saving instruction signal on the time-domain transmission resources.

In a possible implementation, the transmitting device 402 is configured to configure the maximum time occupied by the power saving instruction signal for the terminal through broadcast information; and/or, the transmitting device 402 is configured to configure the time occupied by the power saving instruction signal for the terminal through semi-static signaling or dynamic signaling; and/or, the transmitting device 402 is configured to configure the distance between the power saving instruction signal and the start point of the DRX cycle for the terminal through semi-static signaling or dynamic signaling.

In a possible implementation, the processing device 401 is further configured to configure preset frequency-domain transmission resources for the terminal according to a preset rule; the transmitting device 402 is configured to transmit the power saving instruction signal on the preset frequency-domain transmission resources.

In a possible implementation, the processing device 401 is further configured to configure preset frequency-domain transmission resources for the terminal to be awakened; the transmitting device 402 is configured to configure the preset frequency-domain transmission resources for the terminal to be awakened through semi-static signaling; and transmit the power saving instruction signal on the preset frequency-domain transmission resources.

In a possible implementation, the processing device 401 is further configured to configure frequency-domain transmission resources for the terminal to be awakened; where the frequency-domain transmission resources are for the network device transmitting the power saving instruction signal to the terminal to be awakened; the transmitting device 401 is configured to transmit the frequency-domain transmission resources to the terminal to be awakened through semi-static signaling; and transmit the power saving instruction signal on the frequency-domain transmission resources.

In a possible implementation, the transmitting device 401 is configured to: transmit a first configuration signaling carrying the wake-up identifier and the frequency-domain transmission resources to the terminal to be awakened; or, transmit a first configuration signaling carrying the wake-up identifier and the preset frequency-domain transmission resources to the terminal to be awakened; or, transmit a second configuration signaling carrying the frequency-domain transmission resources to the terminal to be awakened; or, transmit a second configuration signaling carrying the preset frequency-domain transmission resources to the terminal to be awakened; or, transmit a third configuration signaling carrying the wake-up identifier to the terminal to be awakened.

In a possible implementation, the processing device 402 is configured to take one or more of a function of frequency-domain transmission resources of a PDCCH, a function of frequency-domain transmission resources of a synchronization signal, and a function of frequency-domain transmission resources of a PRACH of the terminal to be awakened as the frequency-domain transmission resources configured by the network device for the terminal to be awakened.

In a possible implementation, the processing device 402 is further configured to: not transmit the power saving instruction signal on the frequency-domain transmission resources when determining that the power saving instruction signal to be transmitted on the frequency-domain transmission resources collide with one or more of a synchronization signal, a broadcast signal, a discovery signal and a pilot signal.

In a possible implementation, the frequency-domain transmission resources are different from the frequency-domain transmission resources for transmitting data; or, the frequency-domain transmission resources are obtained by switching frequency-domain transmission resources for transmitting data.

Alternatively, the transmitting device 402 is further configured to transmit a first switching instruction to the terminal; where the first switching instruction notifies the terminal to switch to receive the power saving instruction signal on the frequency-domain transmission resources configured for the terminal; or, the transmitting device 402 is further configured to transmit a second switching instruction to the terminal; where the second switching instruction notifies the terminal to switch from the frequency-domain transmission resources for receiving the power saving instruction signal to the frequency-domain transmission resources for data transmission.

In a possible implementation, a BWP for transmitting the power saving instruction signal is different from a BWP for transmitting data; or, the BWP for transmitting the power saving instruction signal is obtained by switching the BWP for transmitting data.

In a possible implementation, the transmitting device 402 is further configured to: transmit a wake-up instruction signal on a BWP or transmit the wake-up instruction signal in at least one beam direction when determining that the terminal is in an idle state or inactive state; or, transmit the power saving instruction signal in a beam direction where the terminal resides when determining that the terminal is in a connected state.

In a possible implementation, the processing device 401 is further configured to: determine whether wake-up identifiers of terminals to be awakened are the same; and if not, configure a same wake-up identifier for the terminals to be awakened.

In a possible implementation, the transmitting device 402 is further configured to transmit the instruction information for updating the wake-up identifier to the terminal to be awakened; where the instruction information carries the configured wake-up identifier.

In a possible implementation, the processing device 401 is further configured to: configure turning on or off of a wake-up indication mode for the terminal to be awakened; where the turning on of the wake-up indication mode instructs the terminal to be awakened to monitor a PDCCH according to the power saving instruction signal when the DRX cycle starts; and the turning off of the wake-up mode instructs the terminal to be awakened to monitor the PDCCH when the DRX cycle starts; or, the turning on of the wake-up indication mode instructs the terminal to be awakened to monitor the power saving instruction signal before a paging signal; and the turning off of the wake-up mode instructs the terminal to be awakened to directly monitor a PDCCH of the paging signal without detecting the power saving instruction signal before the paging signal.

In a possible implementation, the transmitting device 402 is further configured to: transmit configurations for the turning on or off of the wake-up indication mode to the terminal to be awakened through any one of broadcast information, semi-static signaling or dynamic signaling.

Figure 5:
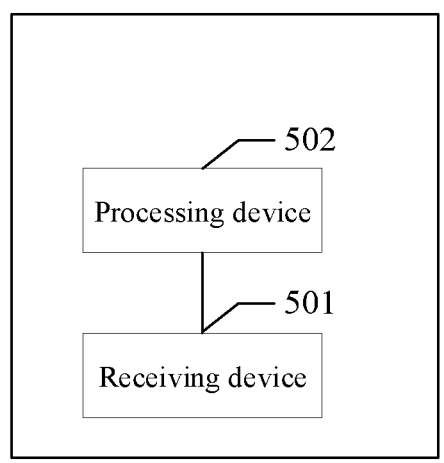
FIG. 5 is a structural schematic diagram of a terminal device provided by an embodiment of the present application.

Based on the same application concept, as shown in FIG. 5, an embodiment of the present application provides a communication device, including: a receiving device 501 configured to receive a power saving instruction signal transmitted by a network device; where the terminal to be awakened is a terminal that needs to be awakened during a DRX cycle; and the wake-up identifier is configured by the network device for at least one terminal to be awakened; a processing device 502 configured to monitor a PDCCH in the DRX cycle according to the power saving instruction signal after determining that a wake-up identifier carried in the power saving instruction signal is the same as its own wake-up identifier.

In a possible implementation, the receiving device 501 is further configured to: receive a wake-up identifier transmitted by the network device through semi-static signaling; where the wake-up identifier is a same wake-up identifier assigned by the network device to at least one terminal to be awakened including the terminal to be awakened.

In a possible implementation, the DRX cycle includes N continuous DRX cycles or N discontinuous DRX cycles; or, the DRX cycle is the $M^{th}$ DRX cycle after the power saving instruction signal; and the N and M are positive integers greater than or equal to 1.

In a possible implementation, the receiving device 501 is further configured to: receive the power saving instruction signal on time-domain transmission resources; where the time-domain transmission resources are configured by the network device for the terminal to be awakened; the time-domain transmission resources correspond to the DRX cycle; and the time-domain transmission resources include a distance between the power saving instruction signal and a start point of the DRX cycle, and/or the maximum time occupied by the power saving instruction signal, and/or the time occupied by the power saving instruction signal.

In a possible implementation, the receiving device 501 is further configured to: receive the maximum time occupied by the power saving instruction signal configured by the network device for the terminal through broadcast information; and/or, receive the time occupied by the power saving instruction signal configured by the network device for the terminal through semi-static signaling or dynamic signaling; and/or, receive the distance between the power saving instruction signal and the start point of the DRX cycle configured by the network device for the terminal through semi-static signaling or dynamic signaling.

In a possible implementation, the receiving device 501 is configured to: receive the power saving instruction signal on preset frequency-domain transmission resources; where the preset frequency-domain transmission resources are configured by the network device for the terminal according to a preset rule.

In a possible implementation, the receiving device 501 is further configured to: receive preset frequency-domain transmission resources through semi-static signaling; where the preset frequency-domain transmission resources are configured by the network device for the terminal to be awakened; and receive the power saving instruction signal on the preset frequency-domain transmission resources.

In a possible implementation, the receiving device 501 is further configured to: receive frequency-domain transmission resources through semi-static signaling; where the frequency-domain transmission resources are configured by the network device for the terminal to be awakened; and receive the power saving instruction signal on the frequency-domain transmission resources.

In a possible implementation, the receiving device 501 is further configured to: receive a first configuration signaling transmitted by the network device; where the first configuration signaling includes the wake-up identifier and the frequency-domain transmission resources or the preset frequency-domain transmission resources; or, receive a second configuration signaling transmitted by the network device; wherein the second configuration signaling includes the frequency-domain transmission resources or the preset frequency-domain transmission resources; or, receive a third configuration signaling transmitted by the network device; where the third configuration signaling includes the wake-up identifier.

In a possible implementation, the frequency-domain transmission resources or the preset frequency-domain transmission resources are one or more of the function of frequency-domain transmission resources of a PDCCH, the function of frequency-domain transmission resources of a synchronization signal, and the function of frequency-domain transmission resources of a PRACH of the terminal to be awakened.

In a possible implementation, the receiving device is further configured to: not receive the power saving instruction signal on the frequency-domain transmission resources; where the frequency-domain transmission resources are frequency-domain transmission resources for receiving the power saving instruction signal; and the frequency-domain transmission resources collide with one or more of a synchronization signal, a broadcast signal, a discovery signal and a pilot signal.

In a possible implementation, the frequency-domain transmission resources are different from frequency-domain transmission resources for transmitting data; or, the frequency-domain transmission resources are obtained by switching frequency-domain transmission resources for transmitting data.

In a possible implementation, the receiving device 501 is further configured to receive a first switching instruction transmitted by the network device; and the processing device 502 is further configured to switch from the frequency-domain transmission resources for data transmission onto the frequency-domain transmission resources configured for the terminal to receive the power saving instruction signal according to the first switching instruction.

In a possible implementation, the receiving device 501 is further configured to receive a second switching instruction transmitted by the network device; or, the processing device 502 is further configured to switch from the frequency-domain transmission resources for receiving the power saving instruction signal to the frequency-domain transmission resources for data transmission according to the second switching instruction.

In a possible implementation, the BWP for transmitting the power saving instruction signal is different from the BWP for transmitting data; or, the BWP for transmitting the power saving instruction signal is obtained by switching the BWP for transmitting data.

In a possible implementation, the terminal is in an idle state or inactive state, and the receiving device 501 is further configured to receive a wake-up instruction signal on the BWP or receive the wake-up instruction signal in at least one beam direction; or, the terminal is in a connected state, and the receiving device 501 is further configured to receive the power saving instruction signal in a beam direction where the terminal resides.

In a possible implementation, the processing device 502 is further configured to determine one beam direction for the wake-up instruction signal transmitted in at least one beam direction; the receiving device 501 is further configured to receive the wake-up instruction signal in the determined beam direction.

In a possible implementation, the receiving device 501 is further configured to receive the indication information for updating the wake-up identifier transmitted by the network device; where the indication information carries the configured wake-up identifier; the processing device 502 is further configured to update the wake-up identifier of the terminal to be awakened to the configured wake-up identifier according to the indication information.

In a possible implementation, the receiving device 501 is further configured to acquire turning on or off of a wake-up indication mode configured by the network device for the terminal to be awakened; the processing device 502 is further configured to configure the wake-up indication mode of the terminal to be awakened according to the configured turning on or off of the wake-up indication mode; the turning on of the wake-up indication mode instructs the terminal to be awakened to monitor a PDCCH according to the power saving instruction signal when the DRX cycle starts; and the turning off of the wake-up mode instructs the terminal to be awakened to monitor the PDCCH when the DRX cycle starts; or, the turning on of the wake-up indication mode instructs the terminal to be awakened to monitor the power saving instruction signal before a paging signal; and the turning off of the wake-up mode instructs the terminal to be awakened to directly monitor a PDCCH of the paging signal without detecting the power saving instruction signal before the paging signal.

In a possible implementation, the receiving device 501 is further configured to acquire turning on or off of the wake-up indication mode configured by the network device for the terminal to be awakened through any one of broadcast information, semi-static signaling or dynamic signaling.

Based on the same application concept, an embodiment of the present application provides a network device including: a processor, a memory, a transceiver, and a bus interface, wherein the processor, the memory and the transceiver are connected through the bus interface.

The processor is configured to read one or more executable programs stored in the memory and perform the following operations: determining a wake-up identifier of a terminal to be awakened; where the terminal to be awakened is a terminal that needs to be awakened during a DRX cycle; and the wake-up identifier is configured by the network device for at least one terminal to be awakened; generating a power saving instruction signal according to the wake-up identifier, and transmitting the power saving instruction signal; where the power saving instruction signal instructs the terminal to be awakened to monitor a PDCCH during the DRX cycle.

In a possible implementation, the processor is configured to read software programs in the memory and perform any one of the methods in the embodiments of the present application.

Based on the same application concept, an embodiment of the present application provides a terminal including: a processor, a memory, a transceiver, and a bus interface, wherein the processor, the memory and the transceiver are connected through the bus interface.

The processor is configured to read one or more executable programs stored in the memory and perform the following operations: receiving an power saving instruction signal transmitted by a network device; where the terminal to be awakened is a terminal that needs to be awakened during a DRX cycle; and the wake-up identifier is configured by the network device for at least one terminal to be awakened; monitoring a PDCCH in the DRX cycle according to the power saving instruction signal after determining that a wake-up identifier carried in the power saving instruction signal is the same as its own wake-up identifier.

In a possible implementation, the processor is configured to read software programs in the memory and perform any one of the methods in the embodiments of the present application.

Based on the same application concept, an embodiment of the present application provides a computer readable storage medium including computer readable instructions. When a computer reads and executes the computer readable instructions, the computer is caused to perform any one of the methods provided by the embodiments of the present application.

Based on the same application concept, an embodiment of the present application provides a computer program product including computer readable instructions. When a computer reads and executes the computer readable instructions, the computer is caused to perform any one of the methods provided by the embodiments of the present application.

The relevant parts of the method embodiments of the present application can be referred to each other; and the devices provided by the device embodiments are used to perform the methods provided by the corresponding method embodiments, so the device embodiments can be understood with reference to the relevant parts in the related method embodiments.

Embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for transmitting a signal, the method comprising:
assigning, by a network device, a wake-up identifier for at least one terminal to be awakened;
transmitting, by the network device, the wake-up identifier to the at least one terminal to be awakened through semi-static signaling;
determining, by the network device, the wake-up identifier of a terminal to be awakened;
wherein the terminal to be awakened is a terminal that needs to be awakened during a Discontinuous Reception (DRX) cycle; generating, by the network device, a power saving instruction signal according to the wake-up identifier; wherein the power saving instruction signal instructs the terminal to be awakened to monitor a Physical Downlink Control Channel (PDCCH), during the DRX cycle, and
transmitting, by the network device, the power saving instruction signal on a preset frequency-domain transmission resource;
wherein, in a case that the network device determines that the power saving instruction signal to be transmitted on the frequency-domain transmission resource collides with one or more of a synchronization signal, a broadcast signal, a discovery signal and a pilot signal, the power saving instruction signal is not transmitted on the frequency-domain transmission resource.

2. The method of claim 1, wherein, before the network device determines the wake-up identifier of the terminal to be awakened, the method further comprises:
configuring, by the network device, a wake-up identifier for the terminal to be awakened if the network device determines that the terminal to be awakened has no wake-up identifier, or
setting, by the network device, a wake-up identifier of the terminal to be awakened as a dedicated identifier if the network device determines that the terminal to be awakened has no wake-up identifier.

3. The method of claim 1, wherein, before the network device transmits the power saving instruction signal, the method comprises:
configuring, by the network device, time-domain transmission resources for the terminal;
wherein the time-domain transmission resources correspond to the DRX cycle; and the time-domain transmission resources comprise:
a distance between the power saving instruction signal and a start point of the DRX cycle, and/or
a maximum time occupied by the power saving instruction signal, and/or a time occupied by the power saving instruction signal; and
the transmitting, by the network device, the power saving instruction signal, comprises:
transmitting, by the network device, the power saving instruction signal on the time-domain transmission resources;
wherein, before the network device transmits the power saving instruction signal, the method further comprises:
configuring, by the network device, the maximum time occupied by the power saving instruction signal for the terminal through broadcast information; and/or,
configuring, by the network device, the time occupied by the power saving instruction signal for the terminal through semi-static signaling or dynamic signaling; and/or,
configuring, by the network device, the distance between the power saving instruction signal and the start point of the DRX cycle for the terminal through semi-static signaling or dynamic signaling.

4. The method of claim 1, wherein, before the network device determines the wake-up identifier of the terminal to be awakened, the method further comprises:
configuring, by the network device, the preset frequency-domain transmission resource for the terminal according to a preset rule.

5. The method of claim 1, wherein, before the network device transmits the power saving instruction signal, the method further comprises:
configuring, by the network device, the preset frequency-domain transmission resource for the terminal to be awakened; and
transmitting, by the network device, the preset frequency-domain transmission resource to the terminal to be awakened through semi-static signaling;
wherein, the transmitting, by the network device, the preset frequency-domain transmission resource to the terminal to be awakened through semi-static signaling, comprises:
transmitting, by the network device, a first configuration signaling carrying the wake-up identifier and the preset frequency-domain transmission resource to the terminal to be awakened; or
transmitting, by the network device, a second configuration signaling carrying the preset frequency-domain transmission resource to the terminal to be awakened; or
transmitting, by the network device, a third configuration signaling carrying the wake-up identifier to the terminal to be awakened.

6. The method of claim 4, wherein, the configuring, by the network device, the frequency-domain transmission resource for the terminal to be awakened, comprises:
taking, by the network device, one or more of a function of a frequency-domain transmission resource of a PDCCH, a function of a frequency-domain transmission resource of a synchronization signal, and a function of a frequency-domain transmission resource of a Physical Random Access Channel (PRACH) of the terminal to be awakened as the frequency-domain transmission resource configured by the network device for the terminal to be awakened.

7. The method of claim 4, wherein,
the frequency-domain transmission resource is different from a frequency-domain transmission resource for transmitting data; or,
the frequency-domain transmission resource is obtained by switching a frequency-domain transmission resource for transmitting data; wherein, obtaining the frequency-domain transmission resource by switching the frequency-domain transmission resource for transmitting data comprises:
transmitting, by the network device, a first switching instruction to the terminal;
wherein the first switching instruction notifies the terminal to switch to receive the power saving instruction signal on the frequency-domain transmission resource configured for the terminal; or,
transmitting, by the network device, a second switching instruction to the terminal;
wherein the second switching instruction notifies the terminal to switch from the frequency-domain transmission resource for receiving the power saving instruction signal to the frequency-domain transmission resource for data transmission.

8. The method of claim 7, wherein,
a Bandwidth Part (BWP) for transmitting the power saving instruction signal is different from a BWP for transmitting data; or,
a BWP for transmitting the power saving instruction signal is obtained by switching a BWP for transmitting data.

9. The method of claim 1, wherein, the method further comprises:
transmitting, if the network device determines that the terminal is in an idle state or inactive state, the power saving instruction signal on a BWP; or,
transmitting, if the network device determines that the terminal is in an idle state or inactive state, the power saving instruction signal in at least one beam direction; or,
transmitting, if the network device determines that the terminal is in a connected state, the power saving instruction signal in a beam direction where the terminal resides.

10. The method of claim 1, wherein the method further comprises:
configuring, by the network device, turning on or off of a wake-up indication mode for the terminal to be awakened;
wherein the turning on of the wake-up indication mode instructs the terminal to be awakened to monitor the PDCCH according to the power saving instruction signal when the DRX cycle starts; and the turning off of the wake-up mode instructs the terminal to be awakened to monitor the PDCCH when the DRX cycle starts; or,
wherein the turning on of the wake-up indication mode instructs the terminal to be awakened to monitor the power saving instruction signal before receiving a paging signal; and
the turning off of the wake-up mode instructs the terminal to be awakened to directly monitor the PDCCH of the paging signal without detecting the power saving instruction signal before receiving the paging signal;
wherein, the configuring, by the network device, the turning on or off of the wake-up indication mode for the terminal to be awakened, comprises:
transmitting, by the network device, configurations for the turning on or off of the wake-up indication mode to the terminal to be awakened through any one of broadcast information, semi-static signaling or dynamic signaling.

11. A method for receiving a signal, the method comprising:
receiving, by a terminal to be awakened, the wake-up identifier transmitted by the network device through semi-static signaling; wherein the wake-up identifier is a same wake-up identifier assigned by the network device to at least one terminal to be awakened including the terminal to be awakened;
receiving, by the terminal to be awakened, a power saving instruction signal transmitted by a network device on a preset frequency-domain transmission resource; wherein the terminal to be awakened is a terminal that needs to be awakened during a DRX cycle; and the power saving instruction signal is generated by the network device according to a wake-up identifier; and
monitoring, by the terminal to be awakened, a PDCCH during the DRX cycle according to the power saving instruction signal after determining that the wake-up identifier carried in the power saving instruction signal is equal to its own wake-up identifier;
wherein, in a case that the power saving instruction signal to be transmitted on the frequency-domain transmission resource collides with one or more of a synchronization signal, a broadcast signal, a discovery signal and a pilot signal, the terminal to be awakened does not receive the power saving instruction signal on the frequency-domain transmission resource.

12. The method of claim 11, wherein, the receiving, by the terminal to be awakened, the power saving instruction signal, comprises:
receiving, by the terminal to be awakened, the power saving instruction signal on time-domain transmission resources;
wherein the time-domain transmission resources are configured by the network device for the terminal to be awakened; the time-domain transmission resources correspond to the DRX cycle; and the time-domain transmission resources comprise:
a distance between the power saving instruction signal and a start point of the DRX cycle, and/or
a maximum time occupied by the power saving instruction signal, and/or
a time occupied by the power saving instruction signal;
and/or, receiving, by the terminal to be awakened, a maximum time occupied by the power saving instruction signal configured by the network device for the terminal through broadcast information;
and/or, receiving, by the terminal to be awakened, a time occupied by the power saving instruction signal configured by the network device for the terminal through semi-static signaling or dynamic signaling;
and/or, receiving, by the terminal to be awakened, the distance between the power saving instruction signal and a start point of the DRX cycle configured by the network device for the terminal through semi-static signaling or dynamic signaling.

13. The method of claim 11, wherein the preset frequency-domain transmission resource is configured by the network device for the terminal according to a preset rule.

14. The method of claim 11, wherein, before the terminal to be awakened receives the power saving instruction signal transmitted by the network device, the method further comprises:
receiving, by the terminal to be awakened, the preset frequency-domain transmission resource through semi-static signaling;
wherein the preset frequency-domain transmission resource is configured by the network device for the terminal to be awakened; and the preset frequency-domain transmission resource is for the terminal to be awakened receiving the power saving instruction signal; and
wherein, the receiving, by the terminal to be awakened, the preset frequency-domain transmission resource through semi-static signaling, comprises:
receiving, by the terminal to be awakened, a first configuration signaling transmitted by the network device; wherein the first configuration signaling comprises the wake-up identifier and the preset frequency-domain transmission resource; or
receiving, by the terminal to be awakened, a second configuration signaling transmitted by the network device; wherein the second configuration signaling comprises the preset frequency-domain transmission resource; or receiving, by the terminal to be awakened, a third configuration signaling transmitted by the network device; wherein the third configuration signaling comprises the wake-up identifier.

15. The method of claim 11, wherein, the method further comprises:
   acquiring, by the terminal to be awakened, configurations for turning on or off of a wake-up indication mode configured by the network device for the terminal to be awakened; and
   configuring, by the terminal to be awakened, the wake-up indication mode of the terminal to be awakened according to the configured turning on or off of the wake-up indication mode;
   wherein the turning on of the wake-up indication mode instructs the terminal to be awakened to monitor the PDCCH according to the power saving instruction signal when the DRX cycle starts; and the turning off of the wake-up mode instructs the terminal to be awakened to monitor the PDCCH when the DRX cycle starts; or,
   wherein the turning on of the wake-up indication mode instructs the terminal to be awakened to monitor the power saving instruction signal before receiving a paging signal; and
   the turning off of the wake-up mode instructs the terminal to be awakened to directly monitor the PDCCH of the paging signal without detecting the power saving instruction signal before receiving the paging signal.

16. A terminal, comprising: a processor, a memory, a transceiver and a bus interface, wherein the processor, the memory and the transceiver are connected through the bus interface;
   wherein the processor is configured to read one or more executable programs stored in the memory and perform the method of claim 11.

17. A network device, comprising: a processor, a memory, a transceiver and a bus interface, wherein the processor, the memory and the transceiver are connected through the bus interface;
   wherein the processor is configured to read one or more executable programs stored in the memory and perform:
   assigning a wake-up identifier for at least one terminal to be awakened;
   determining the wake-up identifier of a terminal to be awakened; wherein the terminal to be awakened is a terminal that needs to be awakened during a DRX cycle; and
   generating a power saving instruction signal according to the wake-up identifier; wherein the power saving instruction signal instructs the terminal to be awakened to monitor a PDCCH during the DRX cycle;
   wherein the transceiver is configured to:
   transmit the wake-up identifier to the at least one terminal to be awakened through semi-static signaling;
   transmit the power saving instruction signal on a preset frequency-domain transmission resource; and
   not transmit the power saving instruction signal on the frequency-domain transmission resource in a case that the network device determines that the power saving instruction signal to be transmitted on the frequency-domain transmission resource collides with one or more of a synchronization signal, a broadcast signal, a discovery signal and a pilot signal.

* * * * *